Figure 1:
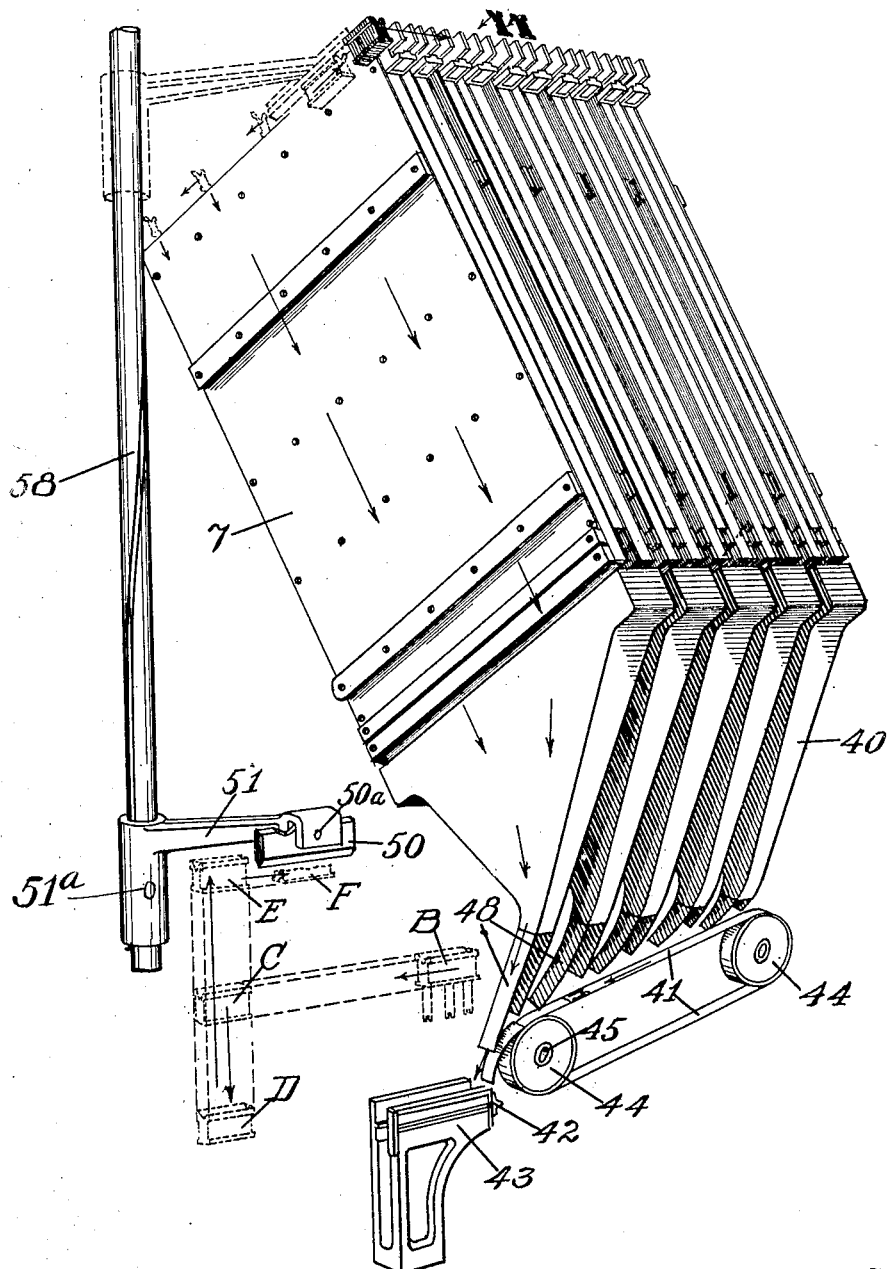

No. 888,402. PATENTED MAY 19, 1908.
T. S. HOMANS.
LINOTYPE MACHINE.
APPLICATION FILED DEC. 12, 1907.
20 SHEETS—SHEET 1.

Witnesses:
Inventor
T. S. Homans
By his Attorney P. T. Dodge

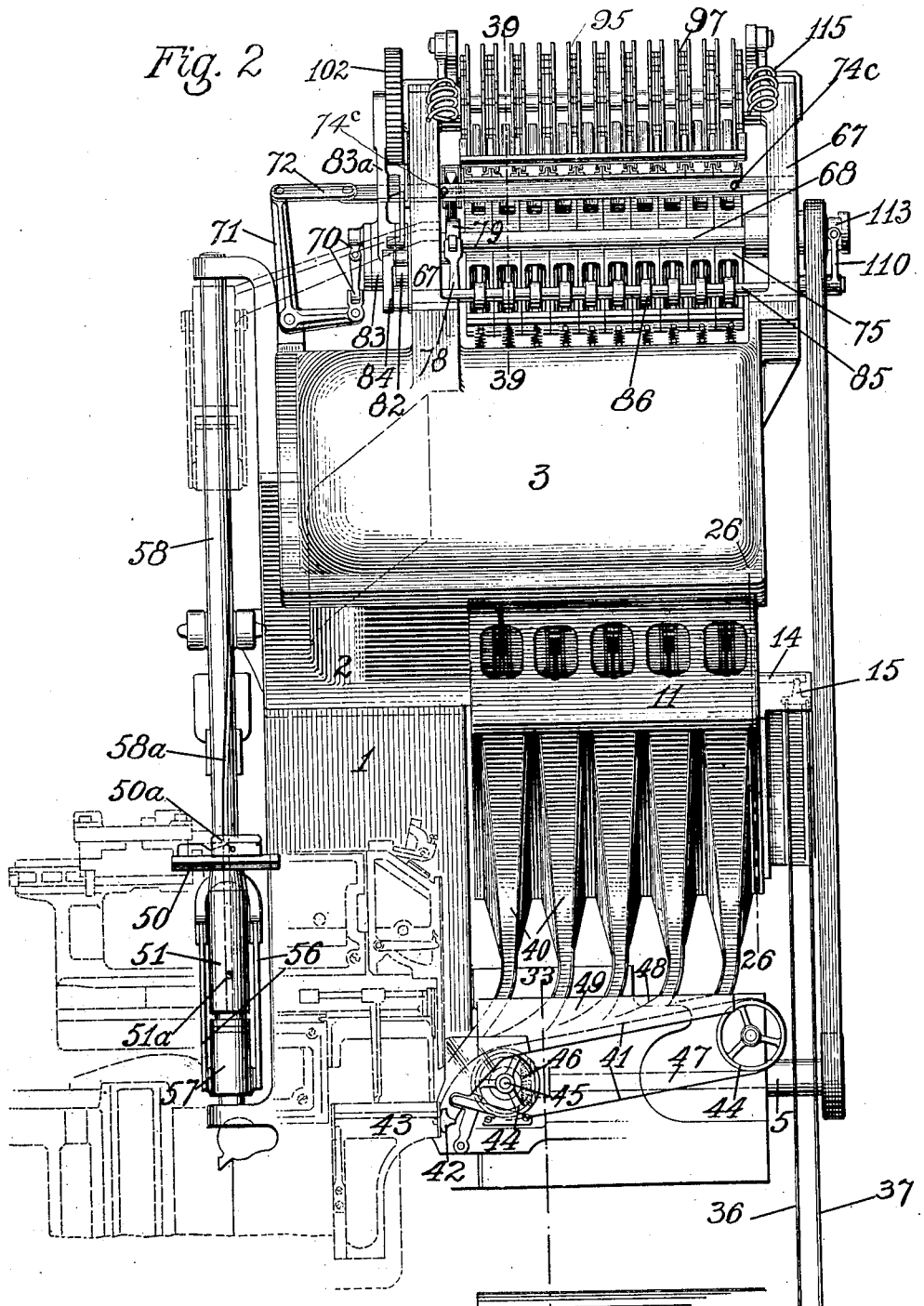

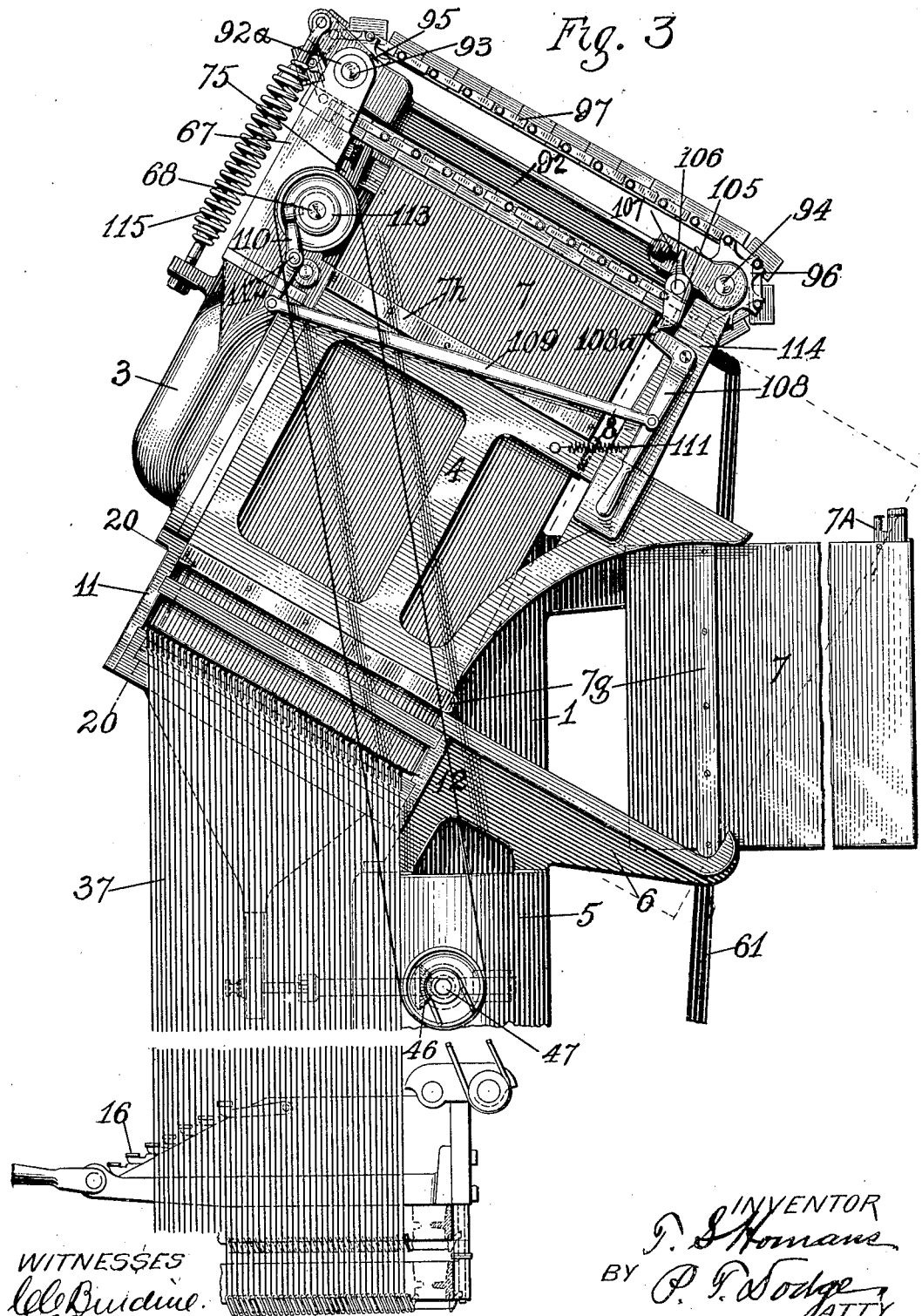

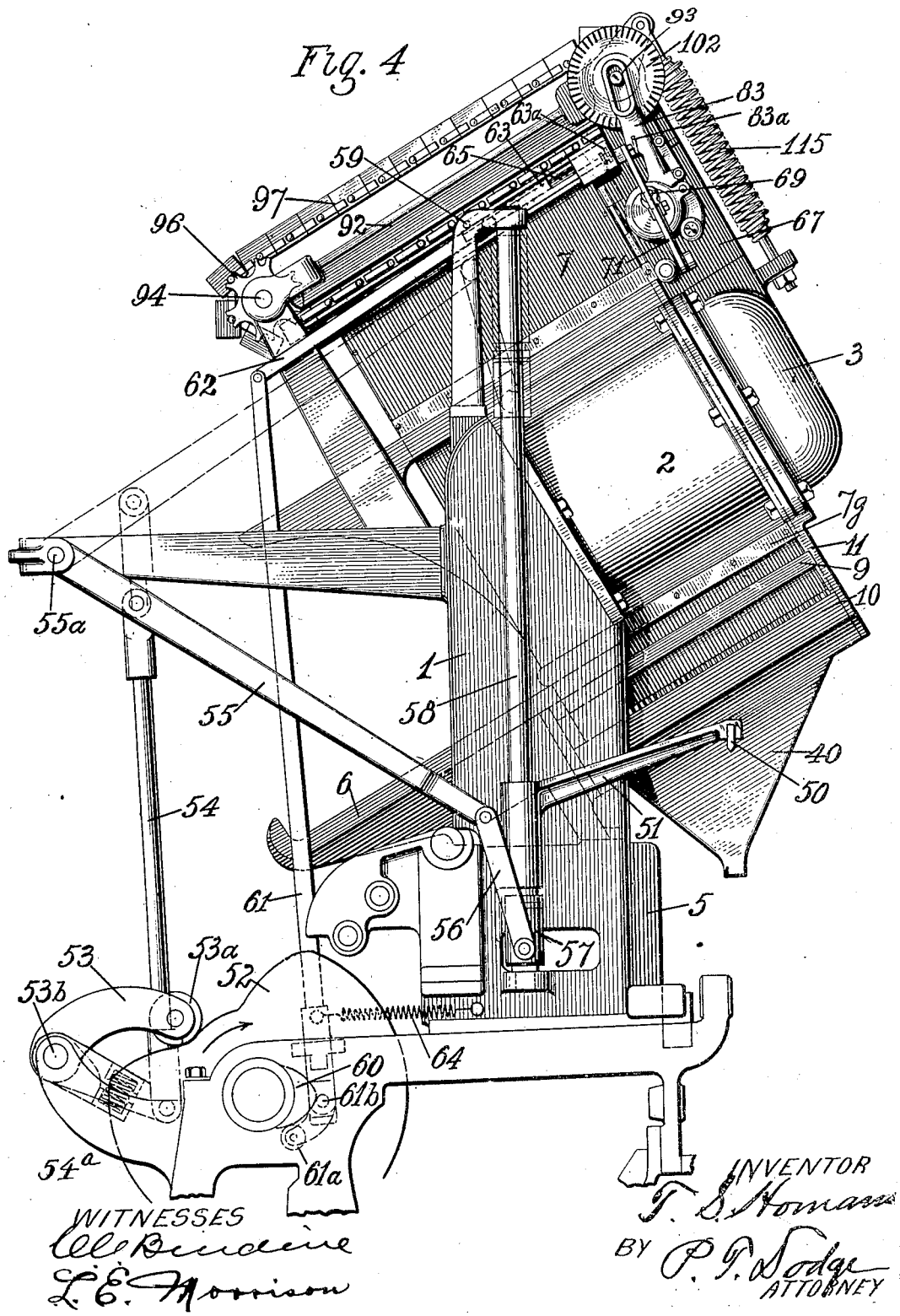

No. 888,402. PATENTED MAY 19, 1908.
T. S. HOMANS.
LINOTYPE MACHINE.
APPLICATION FILED DEC. 12, 1907.
20 SHEETS—SHEET 5.
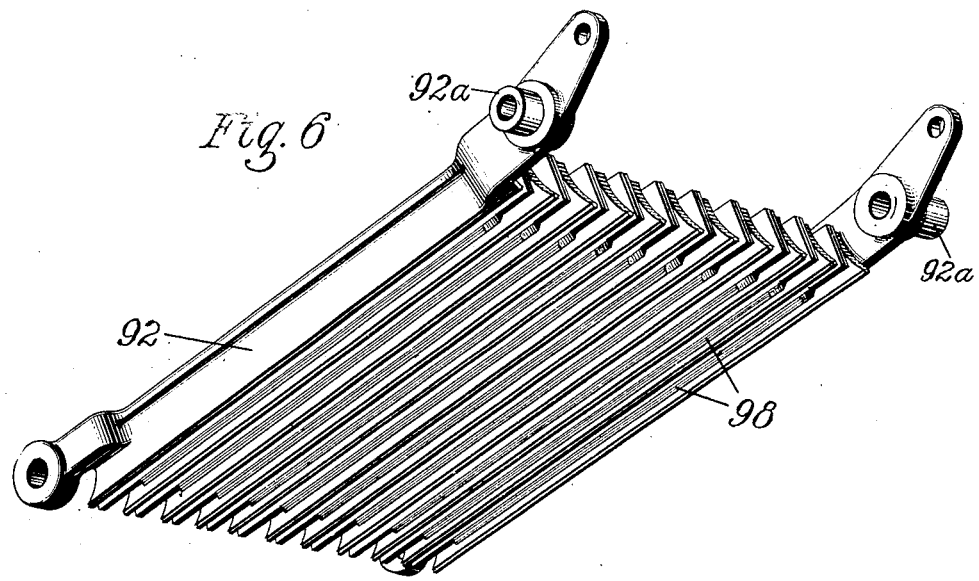
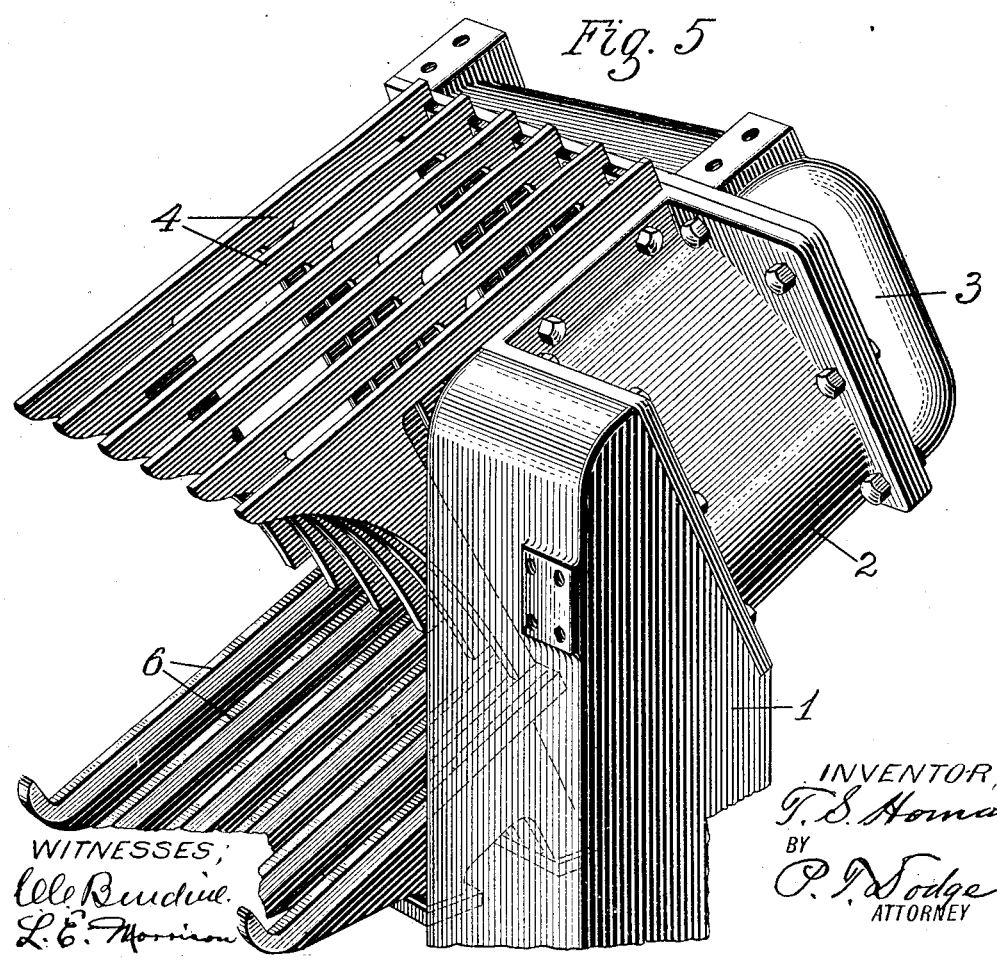
WITNESSES;
INVENTOR,
T. S. Homans
BY
P. J. Dodge
ATTORNEY

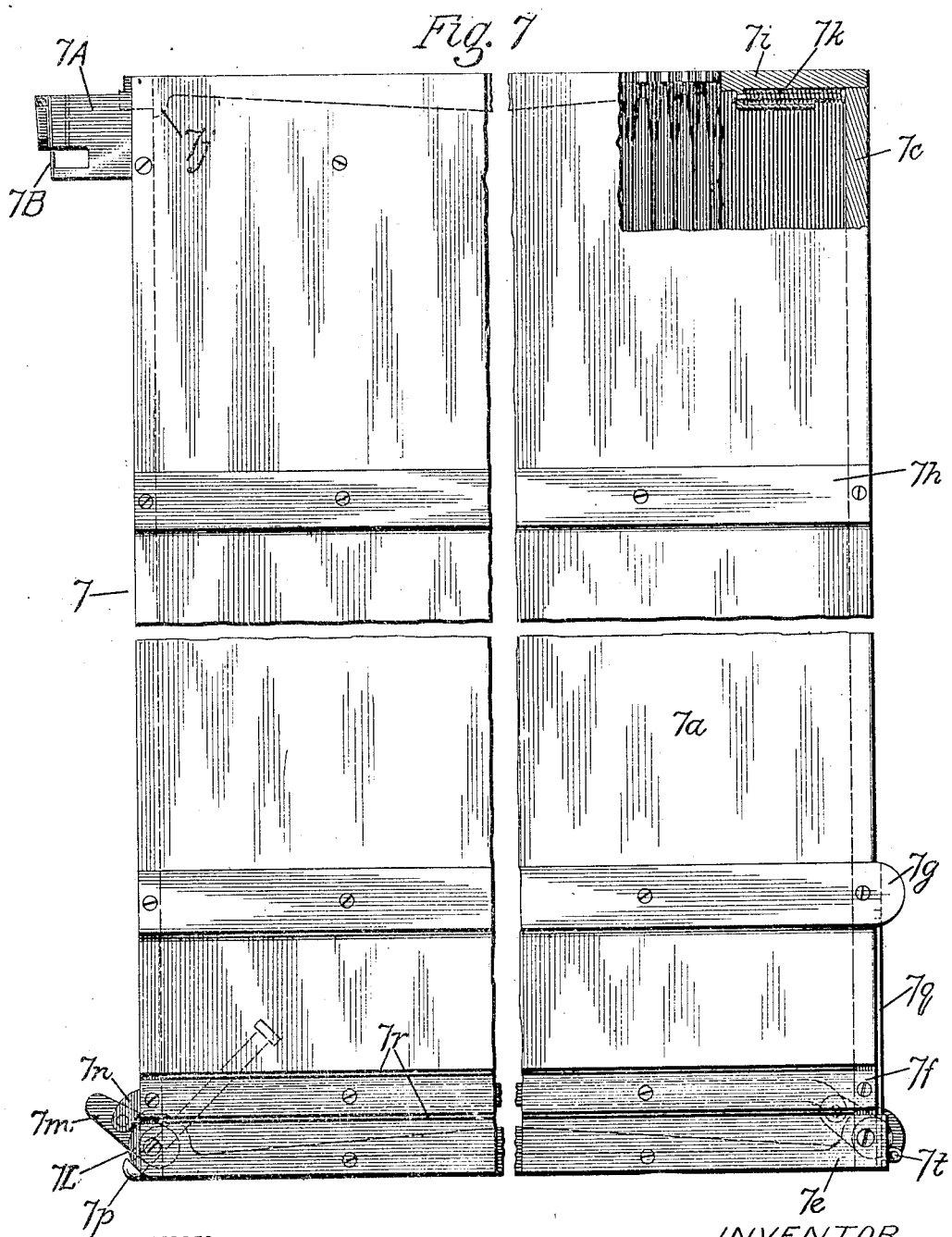

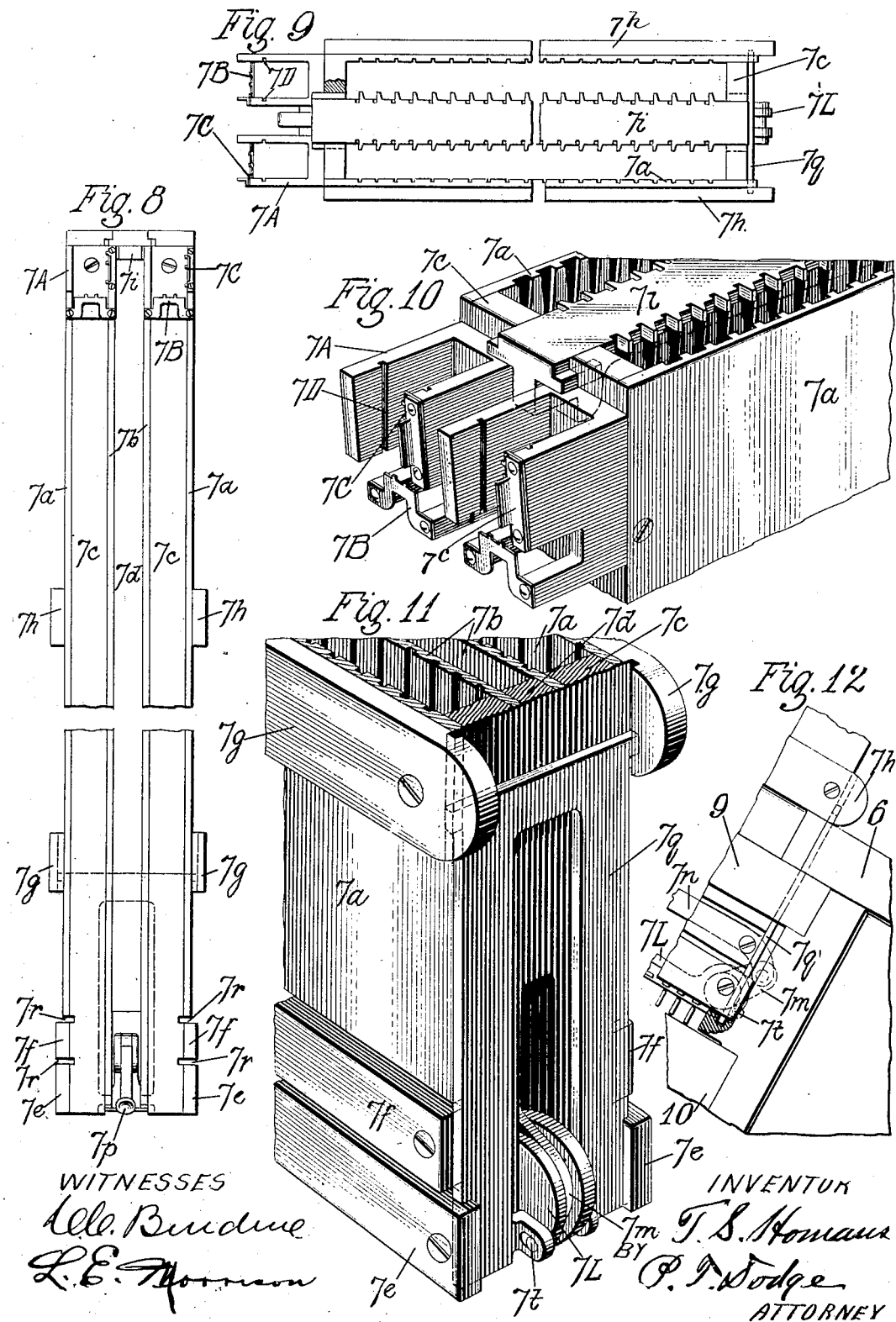

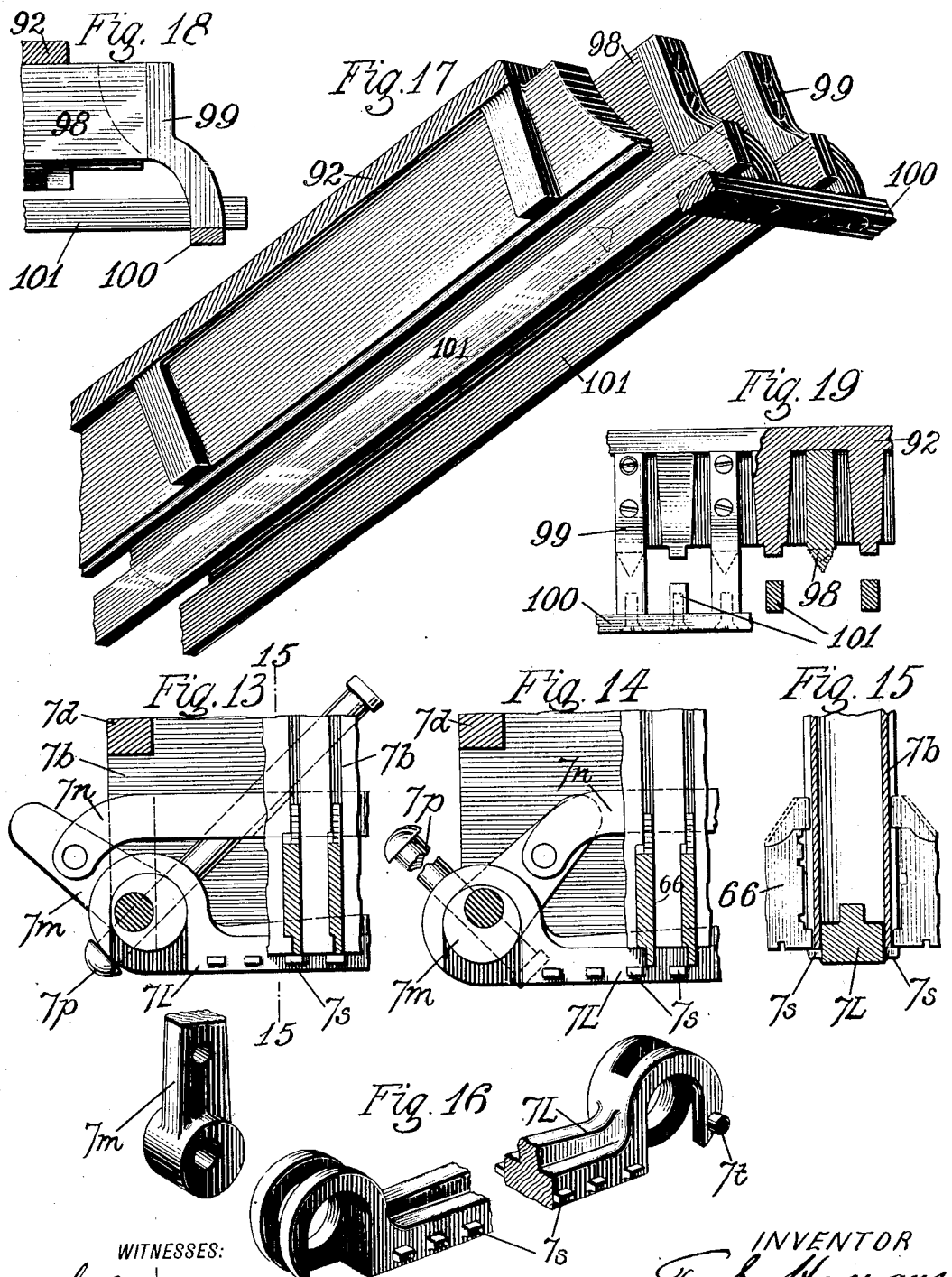

No. 888,402. PATENTED MAY 19, 1908.
T. S. HOMANS.
LINOTYPE MACHINE.
APPLICATION FILED DEC. 12, 1907.
20 SHEETS—SHEET 9.
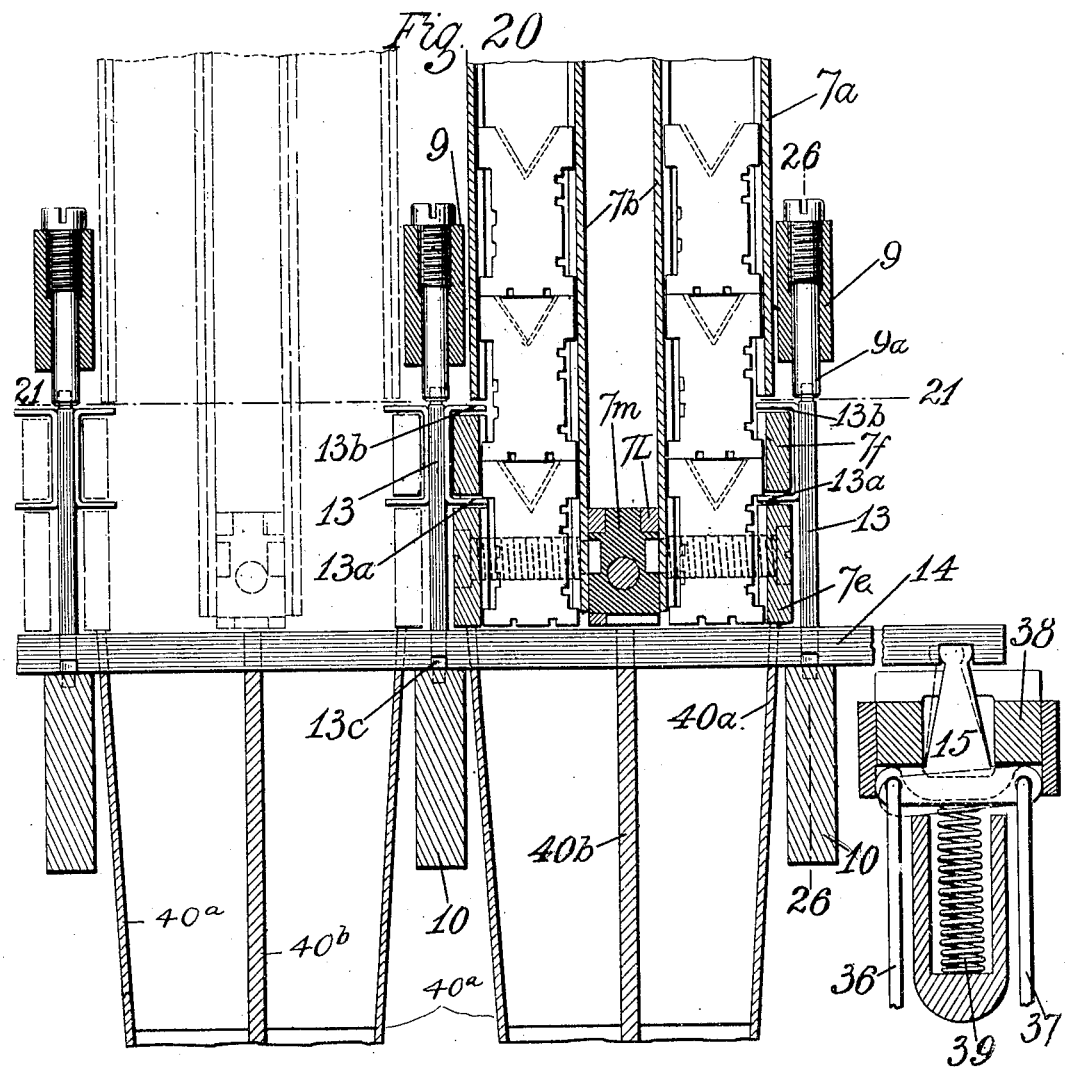
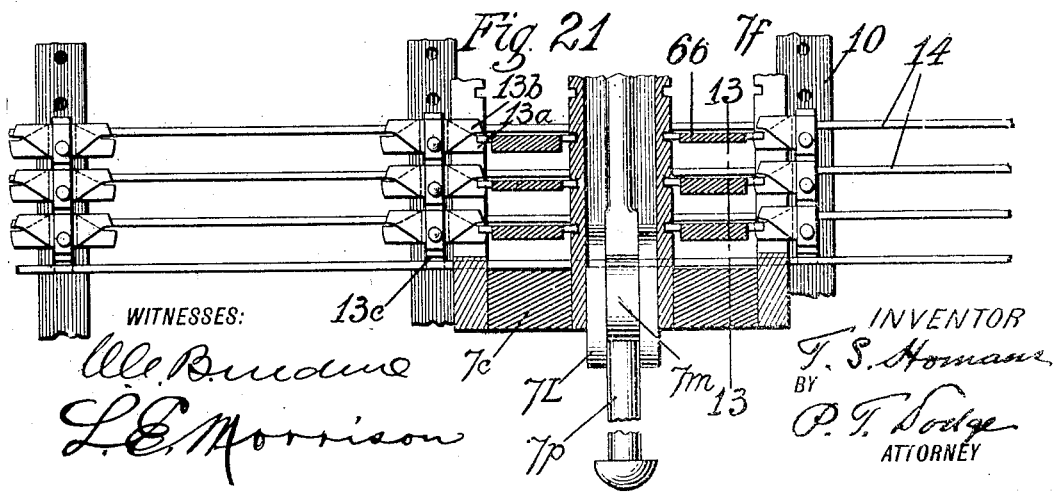

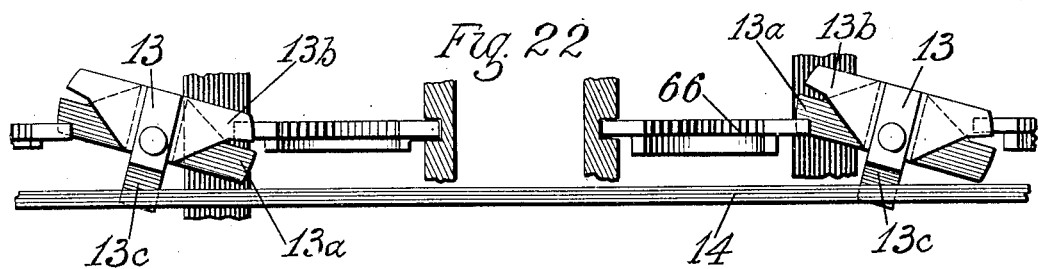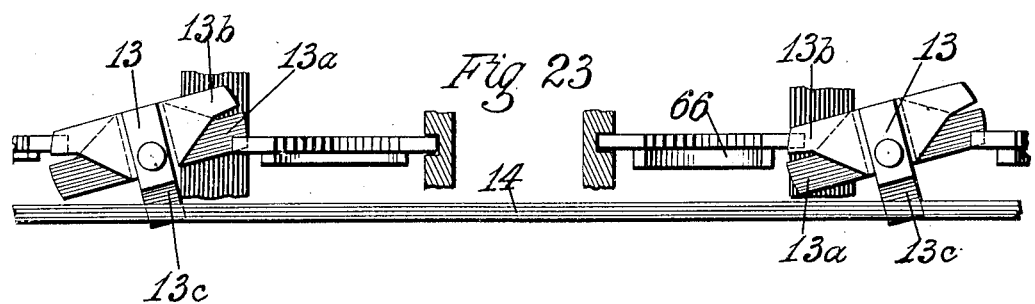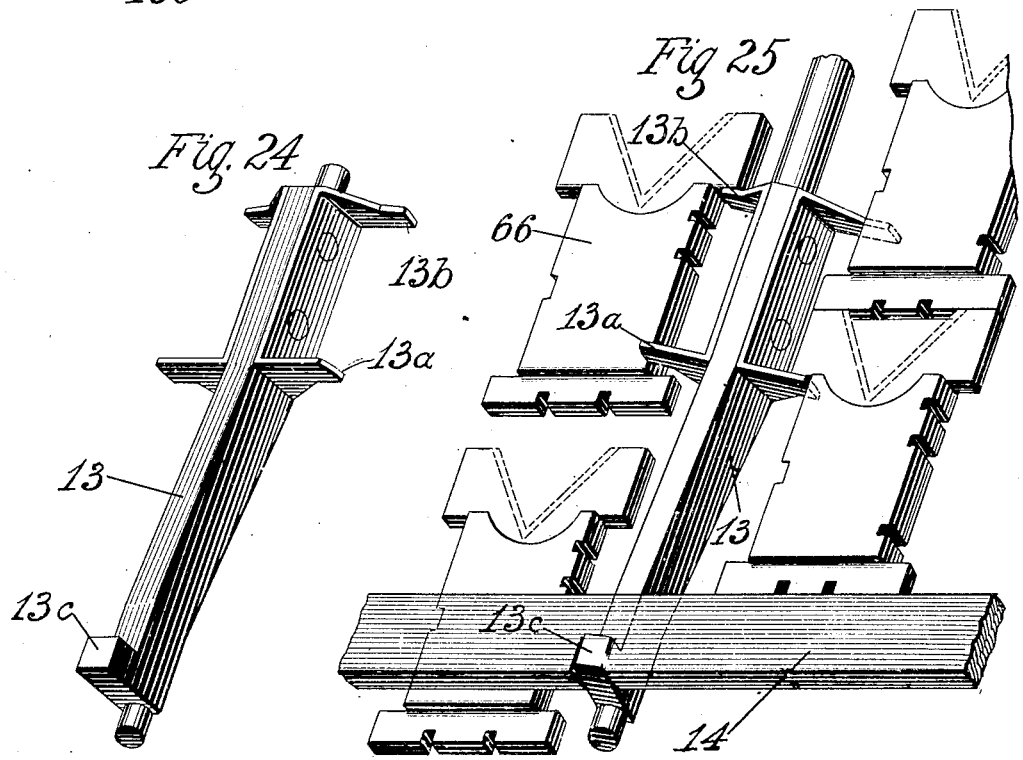

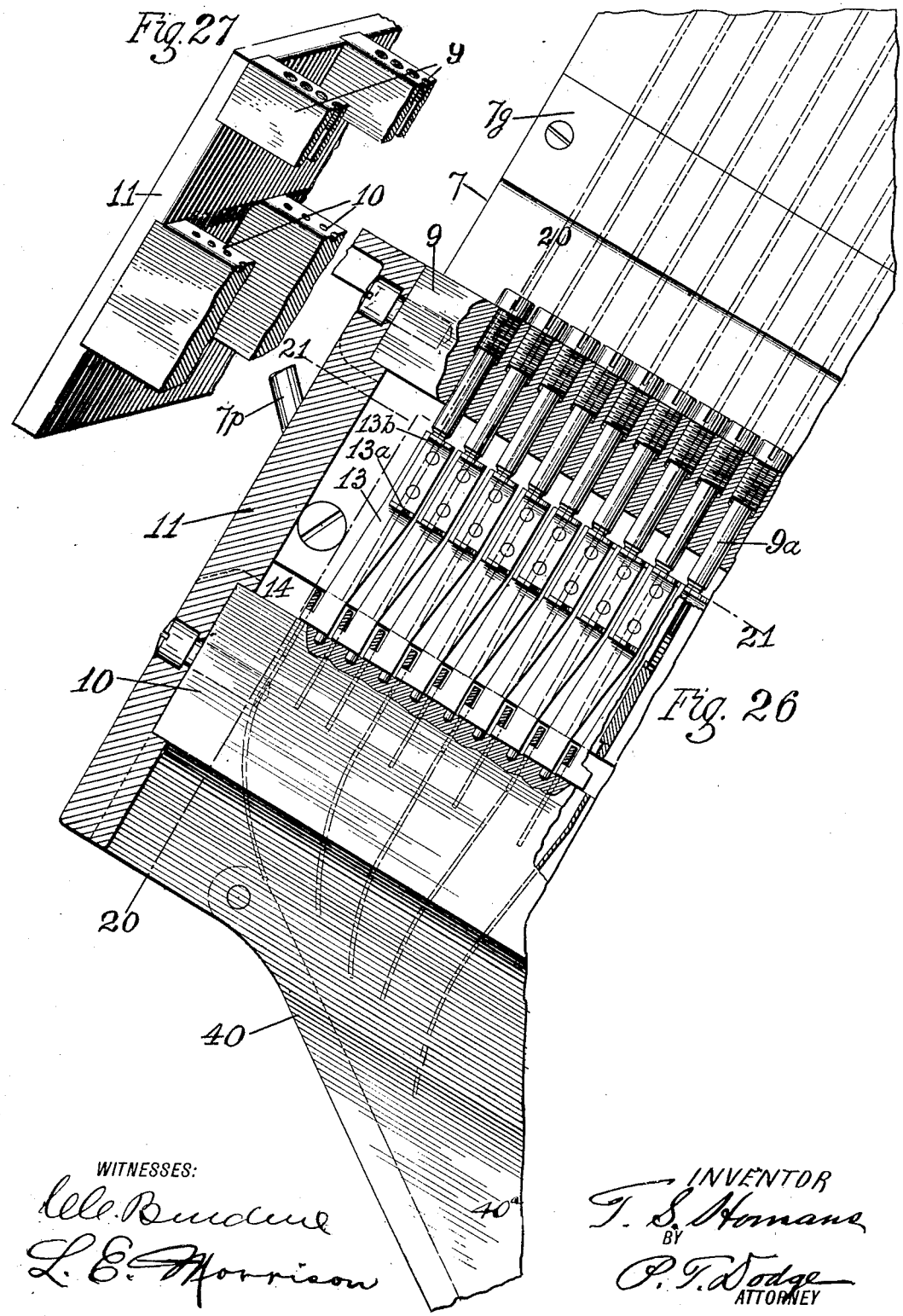

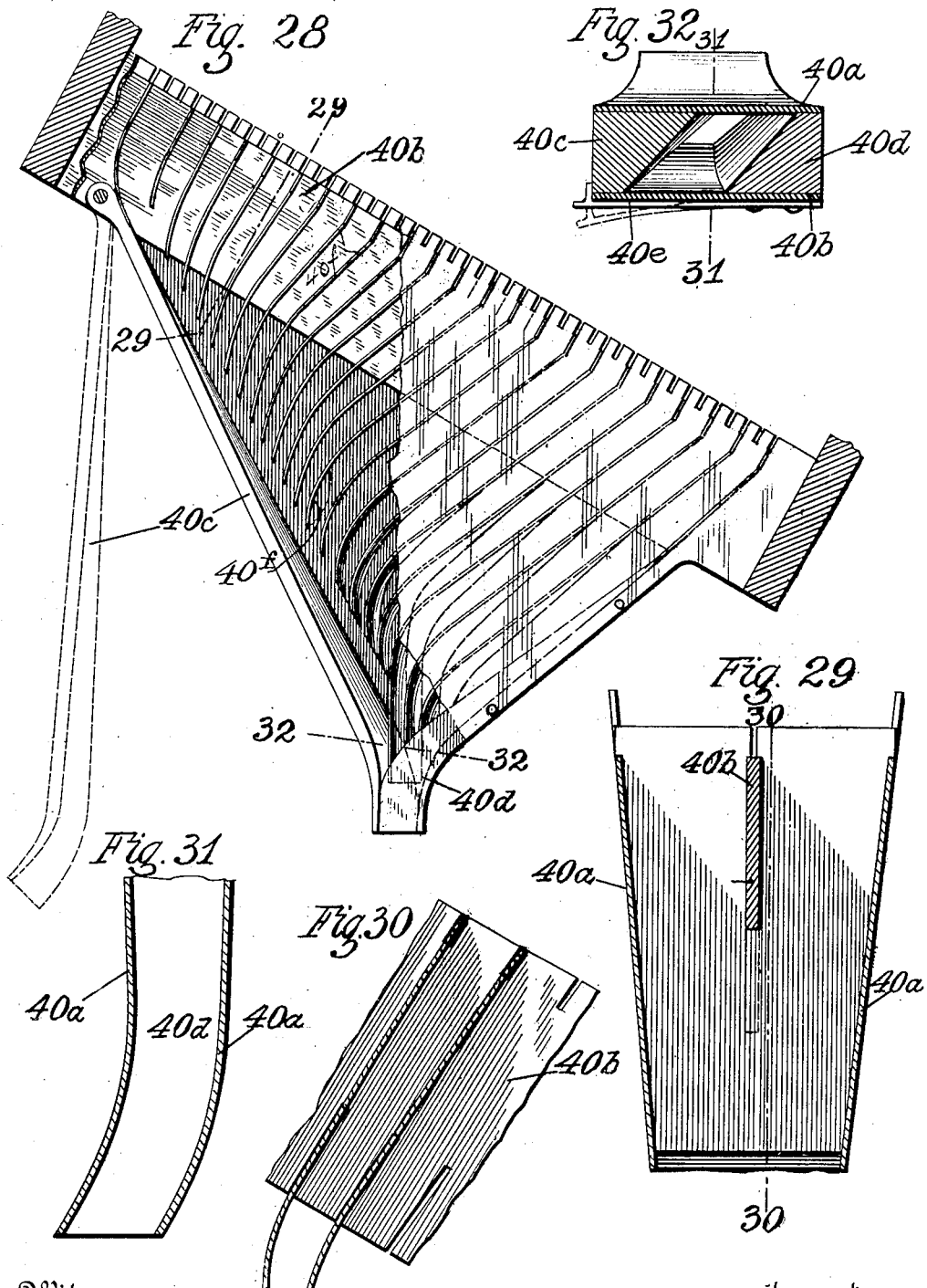

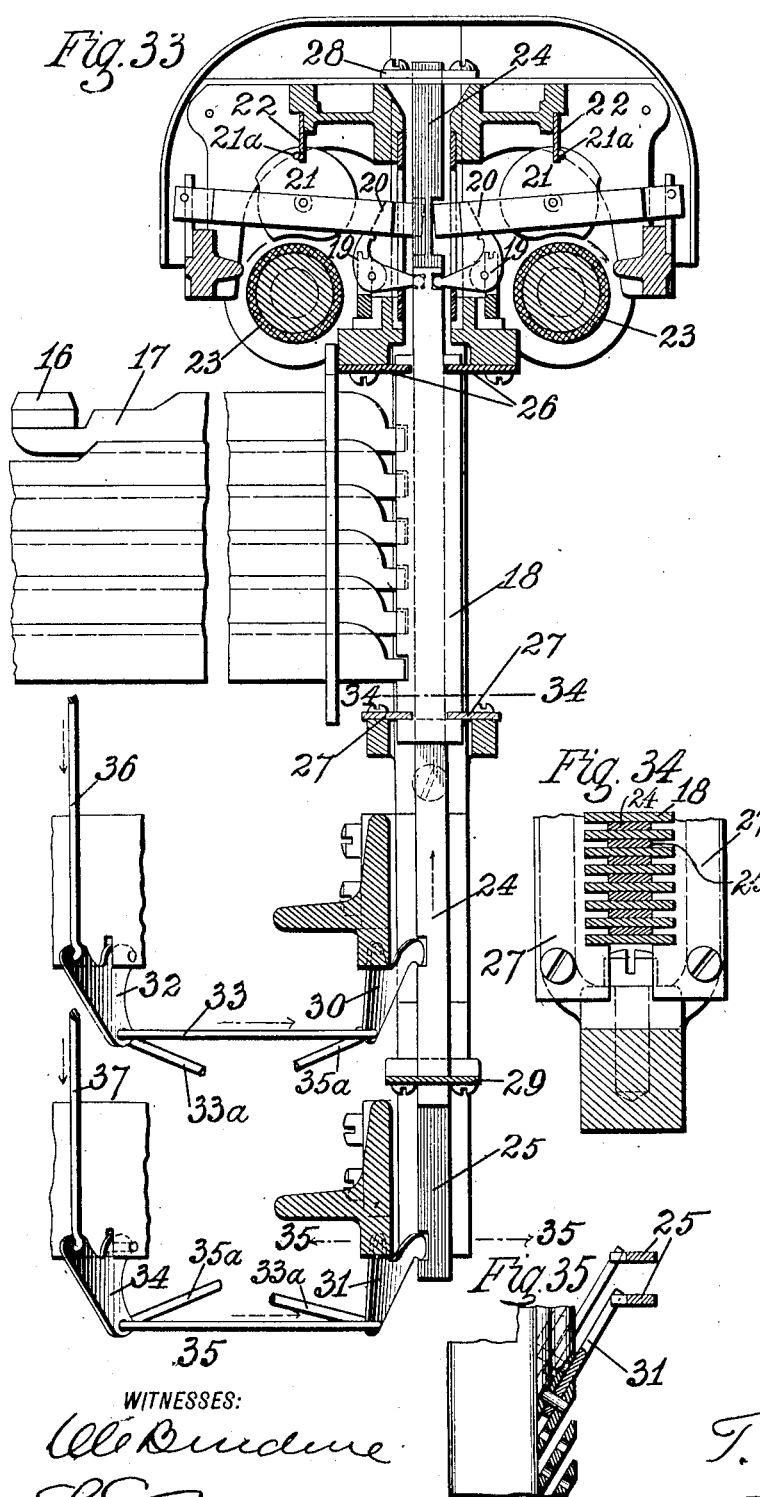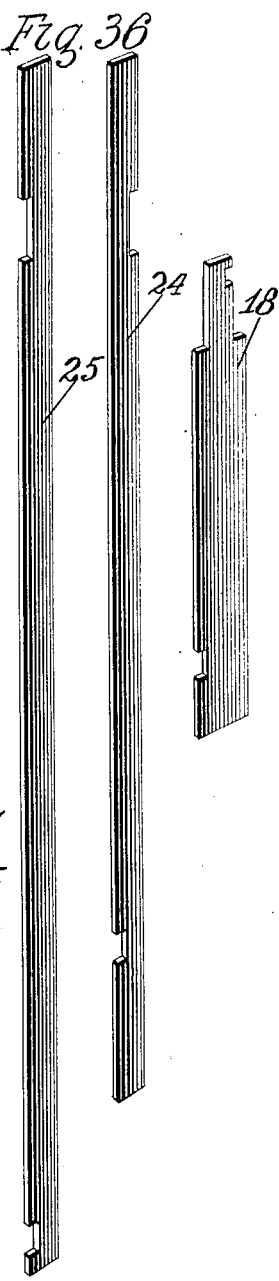

No. 888,402. PATENTED MAY 19, 1908.
T. S. HOMANS.
LINOTYPE MACHINE.
APPLICATION FILED DEC. 12, 1907.
20 SHEETS—SHEET 14.
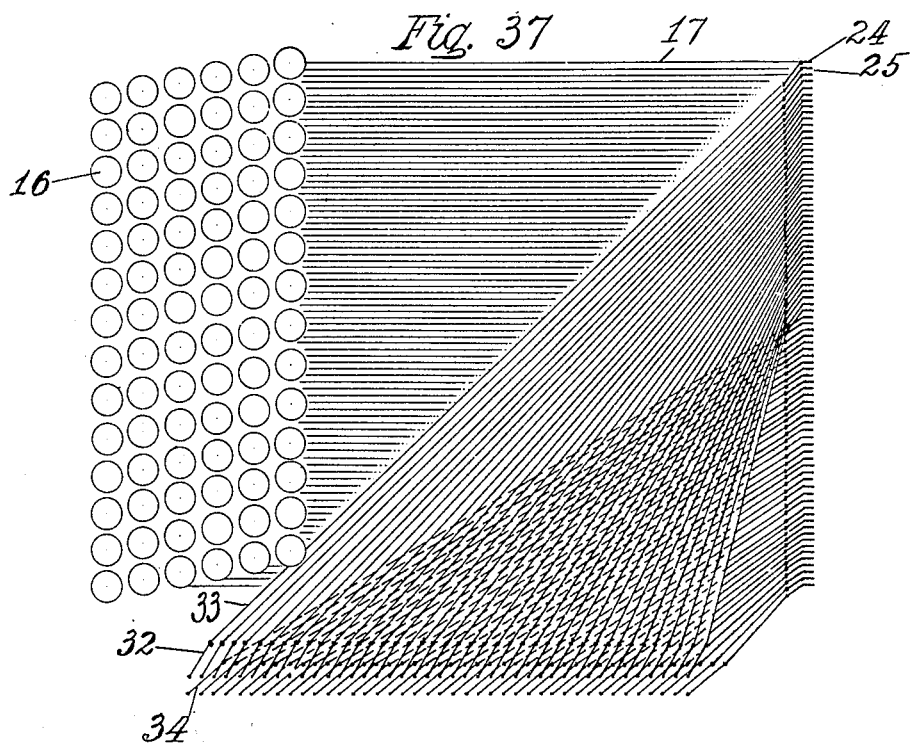
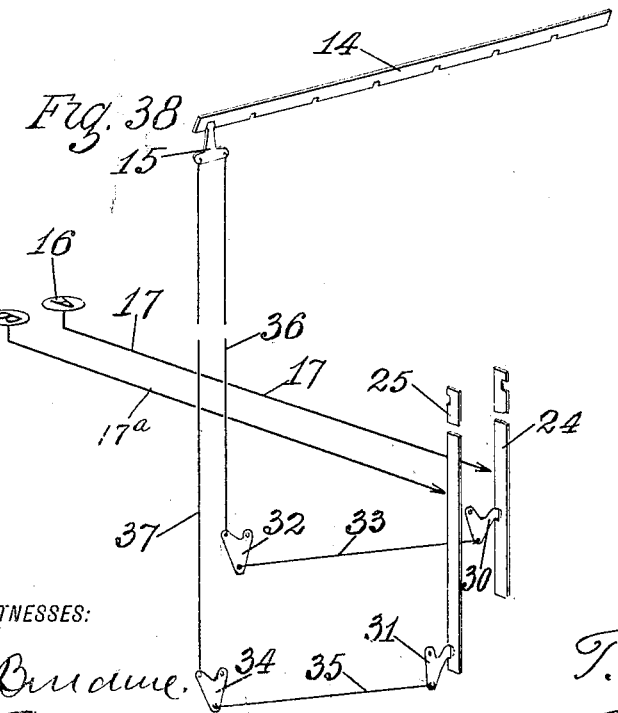
WITNESSES:
INVENTOR
T. S. Homans
BY
P. T. Dodge
ATTORNEY

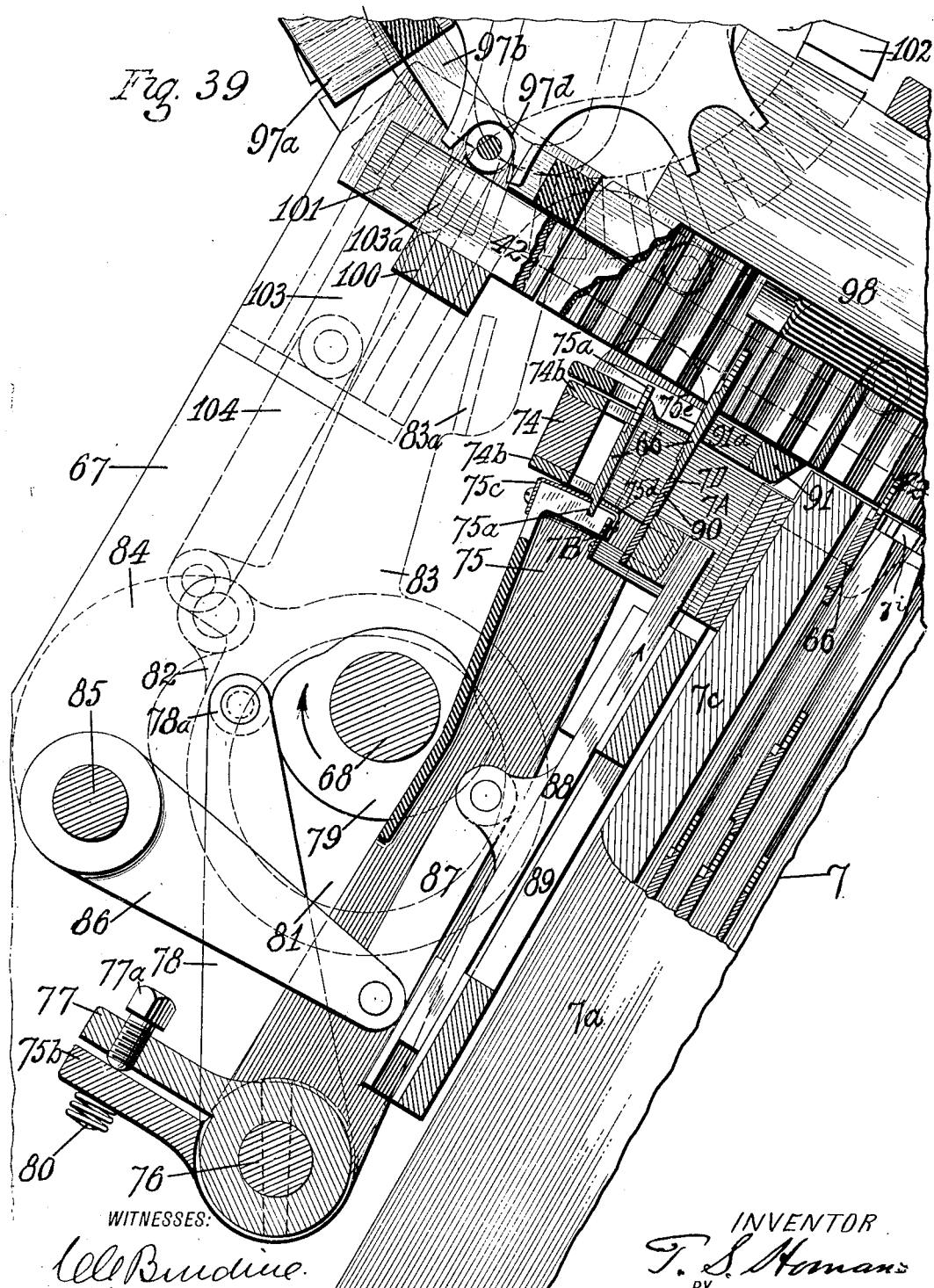

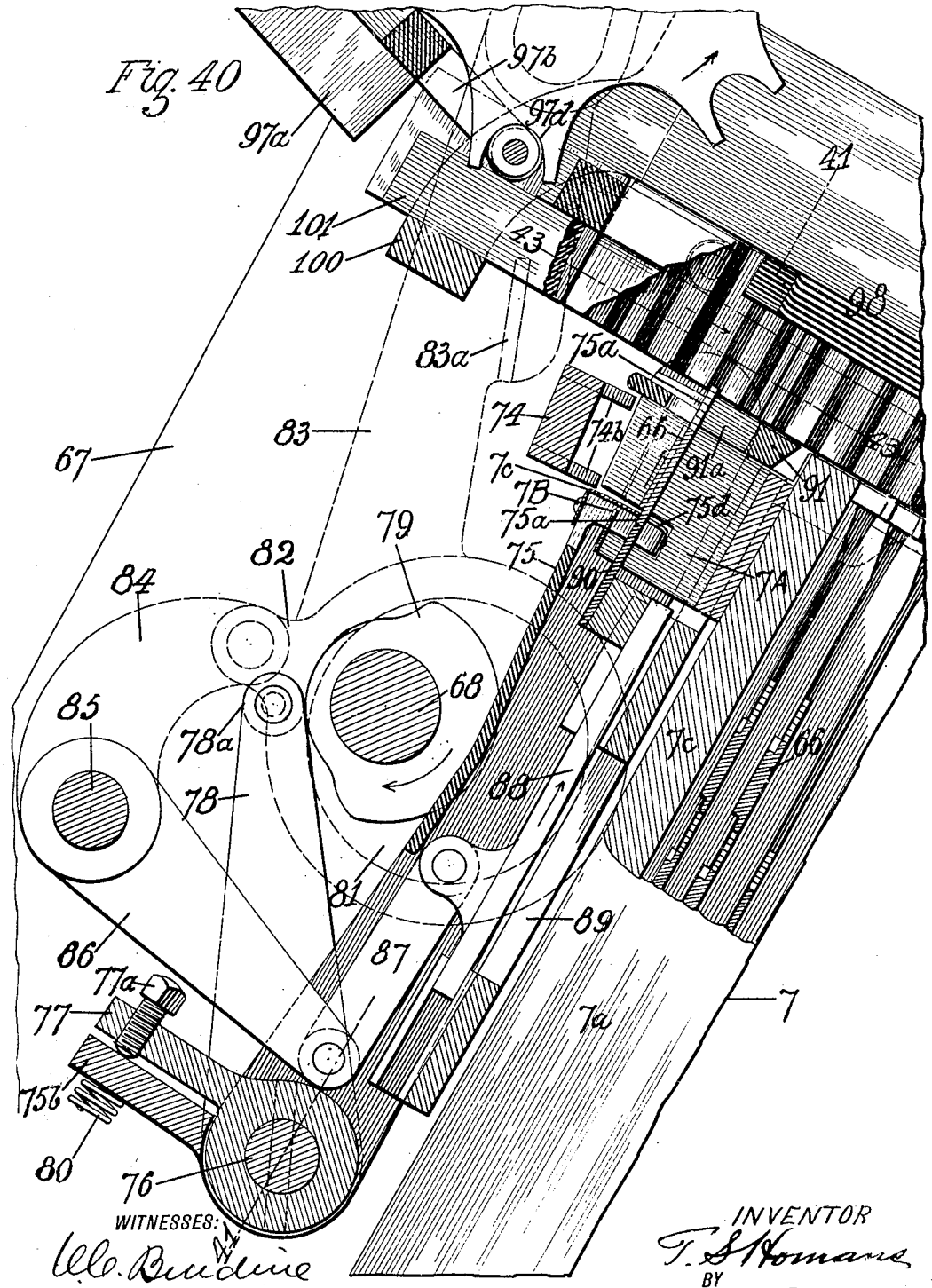

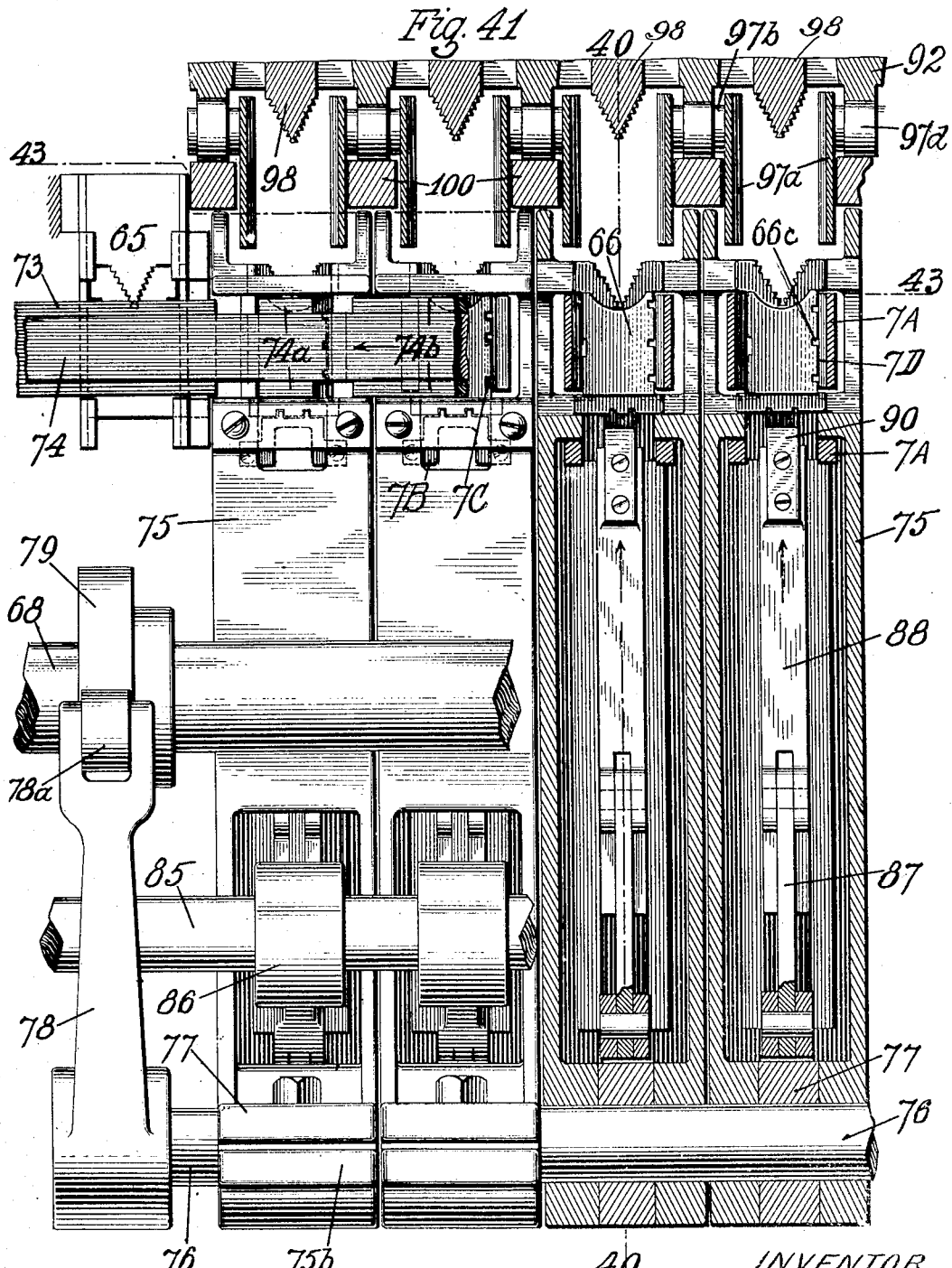

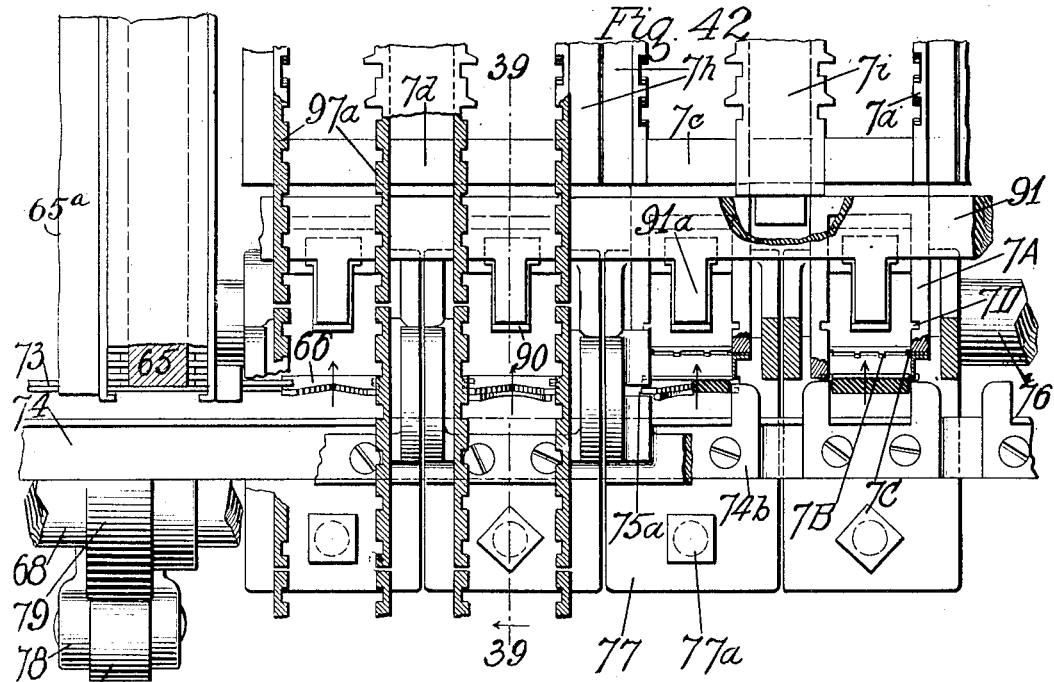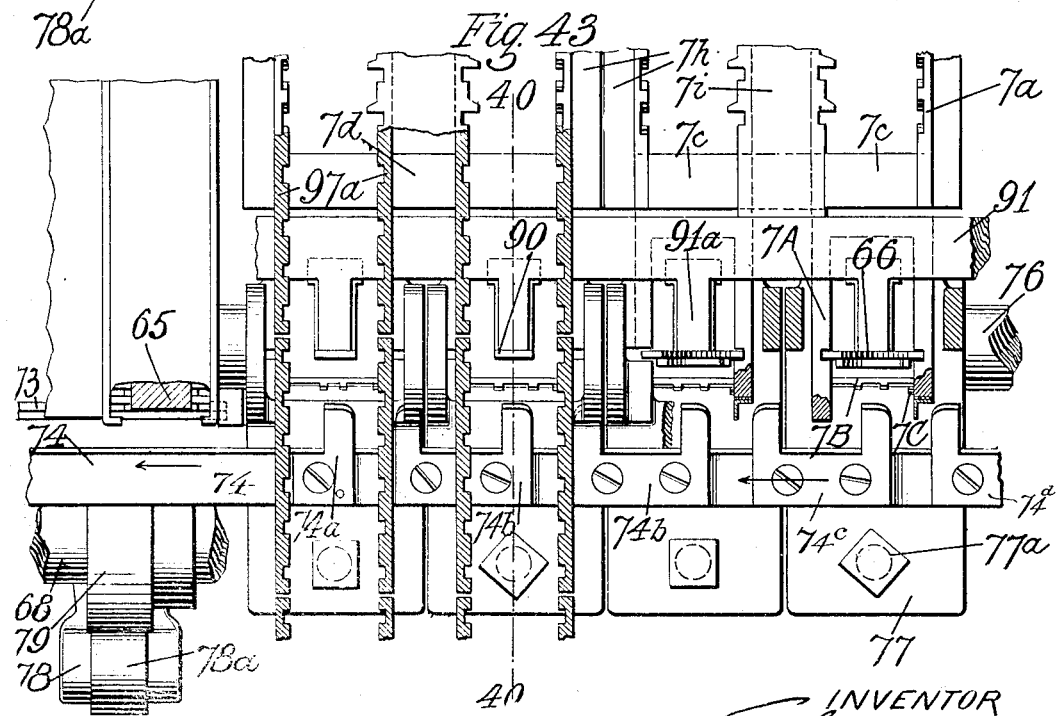

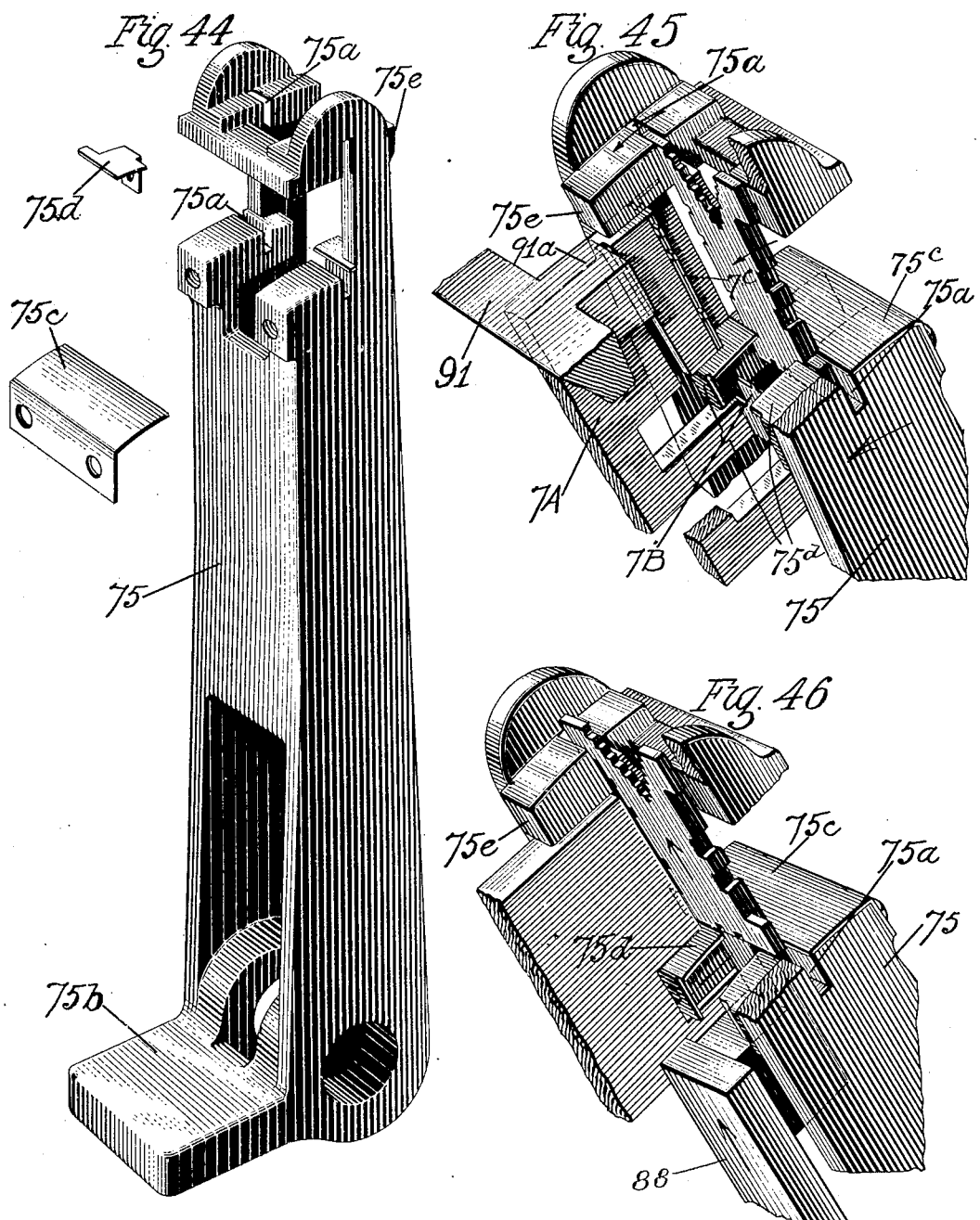

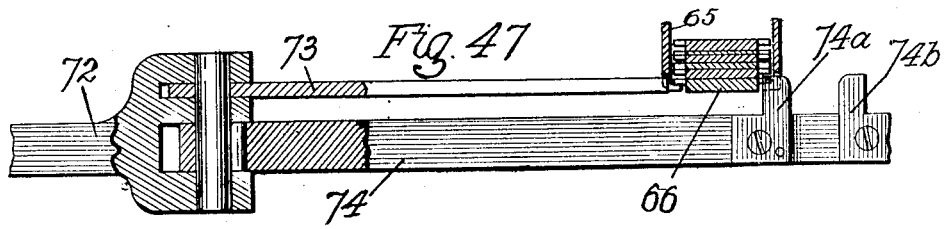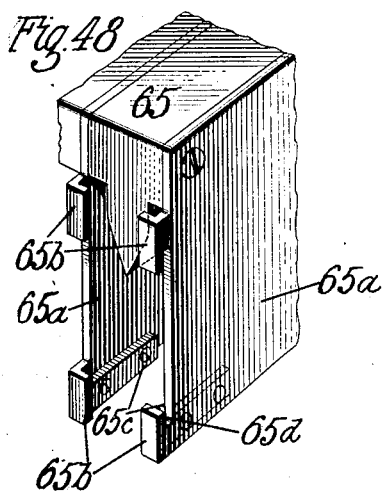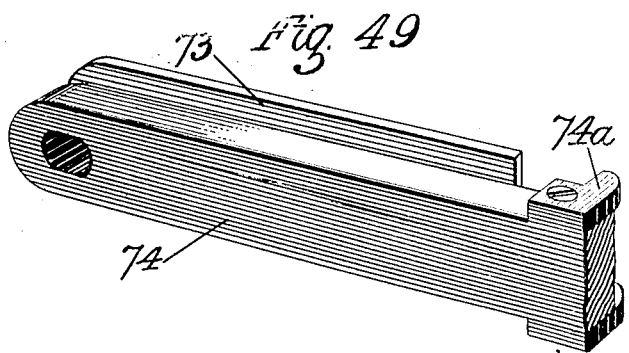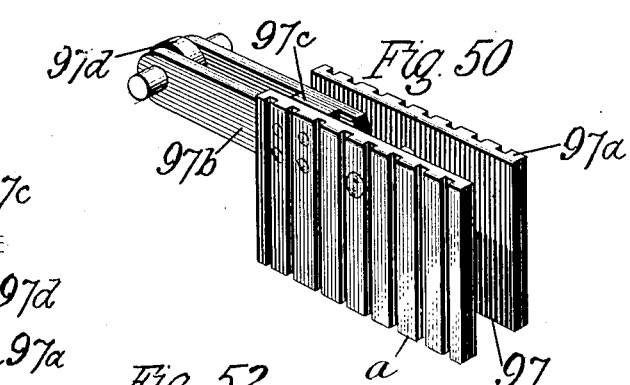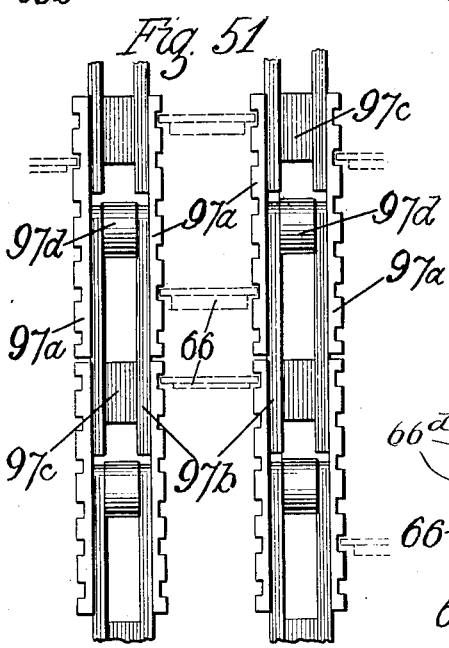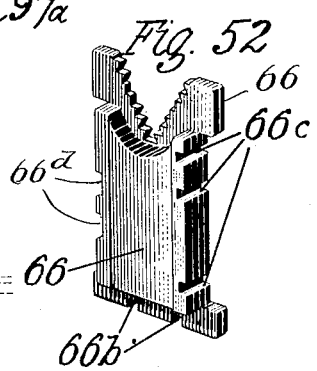

UNITED STATES PATENT OFFICE.

THOMAS SIMMONS HOMANS, OF BROOKLYN, NEW YORK, ASSIGNOR TO MERGENTHALER LINOTYPE COMPANY, A CORPORATION OF NEW YORK.

LINOTYPE-MACHINE.

No. 888,402.   Specification of Letters Patent.   Patented May 19, 1908.

Application filed December 12, 1907. Serial No. 406,164.

*To all whom it may concern:*

Be it known that I, THOMAS S. HOMANS, of the borough of Brooklyn, county of Kings, and State of New York, have invented a new and useful Improvement in Linotype-Machines, of which the following is a specification.

My invention relates to that class of machines wherein circulating matrices, representing type characters and spaces, are released in the required order from a magazine by means of finger-keys, and thereafter assembled or composed in lines which are presented successively to a slotted mold, where they are justified in length so as to tightly close its face, after which the mold is filled with molten metal to form a slug or linotype on the edge of which the type characters to print a line are formed in relief by the matrices, the latter being thereafter returned through a distributing mechanism to the magazine from which they started. Machines of this general character are known in various forms and are represented as to one form in Letters Patent of the United States No. 436,532.

In certain classes of printing, it is desirable to change speedily and frequently the size or style of type faces produced by the machine, and in some cases it is desirable to combine on one slug two or more faces. To this end there have been patented several machines in which two or more magazines containing dissimilar fonts of matrices were combined with composing mechanism through which matrices from either or both magazines could be delivered to the mold.

My invention has reference more especially to machines of the last-named class, and the aim of the invention is to provide a simple and inexpensive construction and arrangement under which two, three or more magazines may be combined with a single composing mechanism in such manner that matrices may be delivered to any line from any one or more of the magazines; and also to provide mechanism by which the matrices may be returned from the composed lines to their respective magazines without arresting or retarding the operation of the machine.

In constructing my machine, I provide flat magazines, preferably of rectangular form, containing grooves or channels to sustain and guide the matrices in upright columns. I arrange these magazines prefer-
ably in vertical, or substantially vertical, positions, and combine with them escapement devices to control the release of the individual matrices, and means whereby the released matrices from all magazines are delivered to a common assembling mechanism. The magazines are preferably canted cornerwise in order to give an inclination to the channels, whereby the matrices are caused to ride on their side faces and thereby subjected to friction in order to retard their descent and prevent the incoming matrices from striking violently on those below. This inclination of the channels to cause friction on the side faces as distinguished from the edges of the matrices, is believed to be new in the art and may be used in magazines of any form and arrangement. I commonly arrange the channels at an inclination of forty-five degrees, more or less, from the vertical. The inclination may be varied, but in any case it should be sufficient to cause an appreciable friction on the side faces of the matrices, and a consequent limitation of the speed at which they descend.

I prefer to guide the released matrices from each magazine through a series of converging channels, and to deliver the matrices from these channels to a single conveyer-belt arranged to deliver them successively to the assembling devices, by which they are set in a compact line.

While escapement devices of any suitable character may be employed to release the matrices, I prefer to arrange the magazines in pairs side by side, and to set between the two magazines of each pair oscillating escapements, each of which acts in connection with both magazines, so that it will release the matrix from one magazine or the other, according to the direction in which it is turned.

The mechanism for receiving the composed lines of matrices and transferring them to the casting mechanism, the casting mechanism, and the mechanism for delivering the matrix lines thence to the distributer are not of the essence of my invention and may be of any suitable construction, for example, that used in the ordinary commercial linotype machine, and may be modified, if need be, in those slight particulars which to the skilled mechanic will suggest themselves.

For the purpose of distributing the matrices, which are provided with distributing teeth, and which differ in form as between the fonts, to their respective magazines, I employ a mechanism of novel construction which first separates them according to font, after which they are delivered to toothed distributer-bars of the Mergenthaler type, which serve to deliver them to their individual channels in the magazine.

For the purpose of actuating the escapements, I employ a power-actuated mechanism controlled by finger-keys, the parts having a novel construction and arrangement as hereinafter described.

I have limited the accompanying drawings to those parts of the machine to which my invention particularly relates, and while I have shown those details of construction which I recommend for general use, it is to be understood that the details may be modified at will within the limits of mechanical skill, provided only the general mode of action herein described is retained. It is also to be understood that the other parts of the machine may be of any ordinary or approved construction.

In the drawings,—Figure 1 is a perspective view of a series of magazines in accordance with my invention, together with means for assembling the matrices and for lifting the composed line to the distributing mechanism. Fig. 2 is a front elevation of the parts shown in the preceding figure, together with the various other coöperating parts. Fig. 3 is a view of the parts shown in the preceding figure looking from the right side. Fig. 4 is a like view from the left side. Fig. 5 is a perspective view showing more particularly the frame for supporting the removable magazines. Fig. 6 is a perspective view of the top frame with the distributer-bars supported therein. Fig. 7 is a side or face view of one of the magazines, with portions broken away to show the internal construction. Fig. 8 is an edge view of a pair of connected magazines. Fig. 9 is a top plan view of the same. Fig. 10 is a perspective view showing the upper end of the magazines on an enlarged scale. Fig. 11 is a perspective view of the lower corner of the pair of magazines. Fig. 12 is a side view of the same with the magazine in operative position in the frame. Fig. 13 is a vertical section through one lower corner of the magazine on the line 13—13, Fig. 21, showing the matrices locked in place therein. Fig. 14 is a similar view with the matrices unlocked. Fig. 15 is a vertical section on the line 15—15 of Fig. 13, through the inner walls of two magazines at their lower ends, illustrating particularly the manner in which the matrices are supported or locked therein. Fig. 16 is a perspective view of the matrix-locking devices as they appear when disconnected. Fig. 17 is a perspective view of a portion of the top frame supporting the distributer-bars, viewed from the under side. Fig. 18 is a side elevation of one end of the same. Fig. 19 is a view looking toward the end of the framework shown in Figs. 17 and 18, with one distributer-bar and adjacent parts shown in vertical cross-section. Fig. 20 is a view looking edgewise against the lower ends of two pairs of magazines, one of them being shown in vertical section to expose the form and arrangement of escapements. Fig. 21 is a horizontal section on the line 21—21 of the preceding figure. Figs. 22 and 23 are plan views illustrating the form and arrangement of the escapements, those in the first figure being turned to the left in their normal positions, and those in the second figure being turned to the right. Fig. 24 is a perspective view of one of the upright rocking escapements. Fig. 25 is a perspective view showing this escapement in its operative relation to two columns of matrices in the adjacent magazines, and also the actuating device. Fig. 26 is a vertical section on the line 26—26 of Figs. 2 and 20, through the space between two magazines, in order to show the form and arrangement of the escapements and their actuating devices. Fig. 27 is a perspective view of a portion of the framework by which the matrices are sustained between the magazines. Fig. 28 is a vertical section through one of the channeled throats used to deliver matrices from the respective magazines to the conveying or conducting mechanism. Fig. 29 is a section on the line 29—29 of Fig. 28, showing the form of the channels through which the matrices pass from the two companion magazines to a common delivery throat. Figs. 30, 31 and 32 are sections on the correspondingly numbered lines of Fig. 28. Fig. 33 is a vertical section from front to rear through the keyboard mechanism on the line 33—33 of Fig. 2. Fig. 34 is a horizontal section on the correspondingly numbered line of Fig. 33, showing the arrangement of the reeds or actuating bars of the keyboard. Fig. 35 is a horizontal section through the lower part of the keyboard mechanism on the correspondingly numbered line of Fig. 33, showing the diagonal arrangement of the levers for communicating motion from the finger-keys. Fig. 36 is a perspective view of typical bars or reeds used in the keyboard. Fig. 37 is a diagram showing the connections from the finger-keys to the escapement-actuating devices. Fig. 38 is a perspective view showing the arrangement through which two finger-keys are enabled to turn the one escapement to the right or left, as demanded. Fig. 39 is a vertical section showing the mechanism for separating the matrices according to font, the section being taken on the correspondingly numbered line of Figs. 44, &c. Fig. 40 is a similar view, with the parts at a different stage in their action. Fig. 41 is a vertical section on the correspondingly numbered line of Fig. 40. Fig. 42 is a plan view of the series of magazines and the adjacent font-separating mechanism, portions being broken away to show it in horizontal section. Fig. 43 is a similar view but with parts in section on the line 43—43, Fig. 41. Fig. 44 is a perspective view of a rocker-arm forming part of the font-separating mechanism, together with small parts detached therefrom. Fig. 45 is a perspective view of the upper end of the cradle on a larger scale, with portions broken away. Fig. 46 is a view similar to the preceding figure, with the parts in different operative positions. Fig. 47 is a view of one of the matrix-separating combs partly in section. Fig. 48 is a perspective view of the receiving end of the distributer-box to which the matrices are delivered. Fig. 49 is a perspective view of the comb shown in Fig. 47. Fig. 50 is a perspective view of one of the distributer-links by which the matrices are carried along the distributer-bar. Fig. 51 is a plan view of a pair of these chains, showing the manner in which they act to carry the intervening matrices. Fig. 52 is a perspective view of one of the matrices.

It is to be understood that the reference made above to sections on vertical and horizontal lines, is intended to include those which are in approximately horizontal and vertical lines, there being in many cases some departure or inclination from the vertical or the horizontal, as the case may be.

*General organization.*—In order that the functions and operation of the various details hereinafter described may be more readily understood, I have illustrated in Fig. 1 the general organization of the machine. In this figure, 7, 7, represent the series of vertical parallel magazines tipped or canted cornerwise and arranged to deliver the released matrices into the funnels or conductors 40 arranged below the respective magazines, and each containing a series of converging channels by which the matrices are directed to a delivery mouth, whence they all pass to a common conveyer-belt 41, by which they are delivered successively into the assembling elevator 43. The composed lines thus formed in the elevator, are raised therein to the position indicated at B in dotted line, whence they are transferred to the left and lowered to the casting mechanism, and thereafter elevated and transferred horizontally to the elevator-bar 50. This bar has a rising and turning motion, whereby it is adapted to deliver the line to the distributing mechanism at the upper corner of the magazines. The line is disintegrated at this point, and the matrices separated according to font, after which they are delivered individually to the proper channels in the respective magazines.

*Matrices.*—The matrices, of which two or more fonts or sets are used in the machine, may be of any form adapted to coöperate with the mechanisms hereinafter described,—either in the identical form in which such mechanisms are shown, or in slightly modified forms,—but I prefer to use matrices of the character commonly employed in commercial Mergenthaler machines of the present day, and described in detail in Letters Patent of the United States No. 436,532. Fig. 52 represents one of the Mergenthaler matrices slightly modified to adapt it for use in the present machine. It consists, as usual, of a flat plate 66, having in the upper end a V-shaped notch with distributing teeth therein, and having also at opposite ends the projecting ears or lips 66$^a$, and in one of the vertical edges one or more intaglio characters or matrices proper 66$^d$. The matrix differs, however, from that of the Mergenthaler patent in that the upper and lower ends are reduced in thickness from one edge to the other to correspond to the thickness of the ears, and also in that it is provided on the lower end with one or more notches 66$^b$, and in the back vertical edge with one or more notches 66$^c$, these notches being utilized to effect a preliminary separation or distribution of the composed matrices according to font.

*Main frame.*—Constructing my machine, I first provide a rigid main-frame, which may be of any form and construction adapted to sustain the other parts hereinafter described. In the form shown in Figs. 2, 3, 4 and 5, this frame consists mainly of an upright column 1 bolted firmly to a suitable base, a neck or casting 2 bolted to the top of the column, and a head 3 bolted to the neck 2 and extended laterally in an overhanging position, as shown in Fig. 5, in order to sustain the magazine-supporting brackets 4, which are bolted firmly thereto, and which will be hereinafter more particularly described. To the column at a lower point, is bolted the supporting bracket 5 for the intermediate shaft 47, and on top of this bracket are secured parallel inclined knees 6 to sustain and guide the magazines during their introduction and removal.

*Magazines.*—The machine may be provided with any reasonable number of magazines, each adapted to hold a font or set of matrices. These magazines 7, are preferably made of rectangular form and are composed each as shown in Figs. 7, 8, &c., of two parallel rectangular metal plates secured to intermediate spacing pieces and each provided in its inner face with longitudinal parallel channels or grooves to receive and guide the ears of the matrices. The grooves of one plate are directly opposite those in the other, so that the matrices introduced at the upper end of the magazine will stand in columns one upon another, the opposite edges of each matrix being guided in the respective plates.

The magazines are open at the ends in order that the matrices may enter at one end, and after descending by gravity, escape at the other, subject, however, to the escapement or controlling devices hereinafter described. Each magazine may be made of a size sufficient to contain an entire font of matrices, but in order to permit of a reduction of their size and admit of their being more conveniently handled, I prefer to rigidly connect the magazines in pairs, as shown in Figs. 8, 9, 11, &c., two magazines being seated, as in Fig. 11, against opposite sides of intermediate spacing strips $7^d$, to which they are firmly secured. Each of the magazines is adapted to receive, for example, the upper case alphabet and attendant characters, while the other will receive the lower case alphabet and attendant characters. This reduction in the size of the individual magazines and their connection in pairs, admits of their being handled as a unitary structure, so that they may be applied to and removed from the machine as one. Across the outer sides of each of the dual magazines I secure the transverse bars $7^g$ and $7^h$, to assist in guiding and sustaining them in the main-frame, as hereinafter described. The outer side-plate of each magazine is shortened or cut away at the lower end, and the outer wall of the magazine completed by horizontal bars $7^e$ and $7^f$ secured firmly in place in such manner as to leave horizontal slots $7^r$ through which the escapement devices act from the outside to control the release of the matrices, as hereinafter explained.

In order to lock the matrices in the magazines of each pair when the magazine is to be removed from the machine, I mount between the magazines at the lower end, as shown in Figs. 7, 8, 11, 12, 14, 15, &c., a locking bar $7^L$, sustained at opposite ends on eccentrics $7^m$, turning on horizontal pivots. The eccentrics at the two sides of the magazine are connected by a bar or link $7^n$, and one of the eccentrics is provided with an operating handle $7^p$. The movement of this handle causes the two eccentrics to turn in unison, so that they impart to the bar $7^L$ both a vertical and a longitudinal movement.

The bar is provided on opposite sides with short projections $7^s$, so located that when the bar is moved in one direction, these projections will underride the side ears of the lowermost matrices in the various columns and lift them upward, as in Fig. 13, thereby locking the matrices within the magazine and also lifting them out of contact with the escapement devices, which latter may therefore be operated without frictional resistance, while the magazine remains on the machine. When, however, the eccentrics are turned to lower the bar and move it endwise, its projections are carried clear of the matrix ears, as shown in Fig. 14, so that the latter may pass out of the magazine between the projections without hindrance thereby. In the event of matrices lodging in the upper end of the magazine or attempting to enter the same in improper positions, it is desirable to effect an automatic stoppage of the distributing mechanism hereinafter described, and for this purpose, and to lock the matrices in the magazine, I provide each of the dual magazines in the upper end with a central sliding bar $7^i$, having at opposite edges protruding teeth and intermediate notches which normally register with the underlying channels in the magazine, so that the entering matrices may pass down through the notches into the magazine without hindrance.

As shown in Fig. 7, the spring $7^k$ tends to urge the bar $7^i$ endwise from its normal position, so that its solid portions will lie over the upper ends of the magazine channels and thus prevent the escape of the matrices in the event of the magazine being inverted. When the magazine is applied to the machine, this bar is pushed back automatically to its normal position to permit the entrance of matrices. At the upper end, each magazine or member of the dual magazine, is provided on one edge with an open boxlike structure $7^A$, the construction and purpose of which will be hereinafter more fully explained. Each magazine is also provided in the lower rear edge with a vertically guided slide $7^q$, Figs. 1, 11 and 12, adapted to interlock at its lower end with a shoulder in the frame and hold the magazine in its operative position. When the slide is moved down to engage the main-frame, it prevents the magazine from sliding out of place, or in other words, holds it in operative position. This locking slide is provided at the lower end with ears which receive studs $7^t$ on one of the eccentrics $7^L$, so that when the eccentrics are turned to unlock the matrices, the same movement will also effect the locking of the magazine in place. Reversely, the unlocking of the magazine prior to removal is accompanied by the locking of the matrices therein.

*Arrangement of magazines.*—The dual magazines above described, are arranged side by side between the brackets 4 of the main frame, as shown in Figs. 1, 2, 3, 4, &c., at short distances apart, their side plates standing in vertical planes, or practically so, while the magazines are canted cornerwise, as shown, in order that the matrix-guiding channels may lie in inclined positions. This arrangement of the magazines so as to give an inclination to the channels, is advantageous in that the matrices are caused to lie and to travel upon their side faces so that they are subjected to friction sufficient to retard their descent and prevent them from striking or pounding violently one upon another, as they are liable to do when permitted to fall through vertical channels. This feature of a laterally inclined channel, that is to say, a channel so arranged that the matrix will travel flatwise on an inclined surface, is wholly new in the art, and it is to be understood that the magazine may be widely modified in form and construction provided this characteristic is retained.

In the commercial Mergenthaler machine, the magazines are inclined sidewise, so that the matrices travel on edge, but this inclination of the magazine is objectionable for the reason that it necessitates a great increase in the width of the machine from front to rear, and the use of complicated mechanisms for guiding the matrices into and out of the magazine. When the magazines are in position, they are supported between the brackets 4 and sustained by their bars $7^h$ resting on top of the brackets, as shown in Fig. 3.

Each magazine may be removed from the machine independently of the others after it is unlocked, by sliding it downward and backward from the operative position to the position indicated by dotted lines in Fig. 3, and then turning or rocking it backward and downward cornerwise in a vertical plane out of the frame to the position in which one of the magazines is shown in full lines in the same figure, after which it may be readily lifted out. As the magazine slides downward, it is supported by the bars $7^g$ riding on top of the knees 6, until the lower rear ends of the bars $7^g$ encounter the upturned ends of the knees, as shown. The ends of the knees serve not only as a stop to limit the sliding motion, but as a fulcrum around which the magazine is turned backward, being supported during this movement by the ends of the bars $7^g$ bearing on the knees, as shown. In introducing the magazine, the reverse operation is followed, the bars $7^g$ being rested on the knees 6, and the magazine rolled or rocked forward in a vertical plane on the knees 6 to the position indicated by dotted lines, between the brackets 4, and finally pushed upward with a sliding motion to its operative position.

When the magazine is pushed home to its final position, the forward end of the matrix-locking slide $7^i$, before referred to, at the upper end of the magazine, encounters the frame which holds the bar back against the pressure of spring $7^k$ in relation to the magazine, so as to permit the free entrance of the matrices at the upper end, as before explained.

*Escapement.*—While any suitable escapement devices may be employed to control the delivery of matrices from the magazine arranged in the position above described, I prefer the construction shown in Figs. 20 to 27, consisting of upright rocking spindles with laterally projecting arms, which latter extend through slots in the outer sides of the magazine to engage the upper and lower ears of the matrices therein. One of these escapements is separately shown in Fig. 24, in which 13 represents the rocking spindle with journals at its upper and lower ends, and $13^a$ and $13^b$ the laterally projecting arms to engage the matrices. The escapements, except those at the outer sides of the machine, are provided each with two pairs of arms projecting in opposite directions for the purpose of controlling the matrices in two adjacent magazines. The escapements are sustained, as shown in Fig. 20, between stationary horizontal bars 9 and 10, secured in the mainframe, the lower bars 10 being recessed to receive the journals of the escapements, while the upper bars 9 are provided with screws 26 having their lower ends recessed to fit over the escapement spindle, this arrangement permitting the removal of any escapement at will. The lower and upper escapement arms $13^a$ and $13^b$ are formed and arranged out of line, as shown, so that as the escapement is rocked to and fro around its vertical axis, the upper and lower arms will alternately engage the successive matrices in the column in such manner as to permit their escape one at a time, the manner of their engagement and disengagement being clearly shown in Figs. 22, 23 and 25. The arms at opposite sides of the escapement are so formed in relation to each other, that when the escapement is turned to the right from its normal position, it will release matrices from one magazine, and when turned to the left from the normal position, it will release matrices from the other magazine.

In order to effect the operation of the escapements, I provide each rocking spindle at the lower end with a lateral arm $13^c$, and I extend across the machine, transversely beneath the series of magazines, horizontally sliding bars 14, each of which is notched to engage the arms of the series of escapements operating in different magazines. By means of this bar, the whole series of escapements connected therewith may be turned to the right or left and thus caused to disengage the matrices in any one of the magazines. In other words, all of the corresponding escapements of the various magazines are actuated in unison. It will be remembered, however, that each magazine is provided at the lower end with the toothed locking bars to retain the matrices therein, and to sustain the matrices out of contact with the escapements.

In the operation of the machine, the bars are adjusted to lock and support the matrices in all the magazines, except those of one pair, at a time. It follows, therefore, that although a number of escapements are actuated at one time, a single matrix only is discharged, and this from one magazine or the other according to the direction in which the bar is moved and the escapements turned.

As one means of operating the escapement-bar 14, I recommend the construction shown in Fig. 20, in which 15 represents a ⊥-shaped lever seated loosely in a bearing in the frame, its upper end being engaged in a notch in the bar 14, while it is centrally sustained from below by a spring 39. Wires 36 and 37 are extended from opposite ends of this lever, and connected through intermediate devices, hereinafter described, with finger keys in the keyboard. If one key is actuated, the wire 37 will be drawn down and the lever 15 caused to rock about its left end as a fulcrum, the effect being to move the bar 14 to the right, thereby turning the escapements in the same direction. If another key is operated, the wire 36 will be depressed and the lever 15 rocked about its right end as a fulcrum, carrying the bar 14 to to the left and turning the escapements in the same direction. Thus it is that the different keys are enabled, through the one actuating device, to turn the series of escapements to the right or left to effect the discharge of the required matrices. It will be understood that those escapements which are outside of the outermost magazines may be made with arms on one side only, as shown on the right-hand in Fig. 20.

As regards the escapement, the essence of my invention lies, first, in an escapement rocking about an axis which extends lengthwise of the magazine and which is provided with upper and lower lips to control the matrices; and second, in providing one escapement with arms or lips projecting in different directions, so that it will release the matrices from one magazine or another, according to the direction in which it is moved in its normal position.

Passing now to the means for operating the escapement wires 36 and 37, attention is directed to Figs. 37 and 38, in which it will be seen that the wires are carried respectively to angular levers 32 and 34, which are in turn connected by wires 33 and 35 to angular levers 30 and 31, which in turn connect with the vertically reciprocating bars or reeds 24 and 25. These reeds are connected respectively to the finger-key levers 17 and 17ª, which are pivoted midway of their length, and which may represent any two characters. Whenever a finger-key is depressed, it communicates motion through the intermediate parts to the bar 14, which in turn actuates the escapement, the latter being turned to the right or left, so as to discharge a matrix from one magazine or the other. The manner in which the wires are extended in order to reach the line of escapements at right angles to the key-board is shown in Fig. 37.

*Assembling characters.*—Instead of having the finger-keys mechanically connected with the escapement-controlling bar 14, in such manner that the pressure of the finger operates the latter, it is advisable to interpose the power-driven mechanism controlled by the finger-keys and in its turn actuating the escapements, as is done in all the commercial machines of the present day. In practice, therefore, I arrange the finger-keys to control such a mechanism, as shown for example in Figs. 33 to 36 inclusive. This mechanism, in its general organization, resembles that used in the commercial Mergenthaler linotype machines and represented in Letters Patent of the United States No. 530,931. The finger-key levers 17 each actuate a vertical slide 18. These slides in turn control angular levers 19 which normally support the inner ends of pivoted rising and falling yokes 20, each of which carries a cam 21 held normally at rest by a projection 21ª thereon bearing against a stationary stop 22. The yokes are arranged in two series on the right and left of the central line in order to permit their compact arrangement, and they operate respectively on the successive vertically sliding reeds 24 and 25 which, it will be remembered, serve to operate the angular levers connecting through the various wires to the escapements. The cams 21 overlie two constantly driven rolls 23 which extend across the keyboard and which are normally out of contact with the cams. When a key is actuated, the corresponding lever 19 releases the yoke 20 permitting the cam 21 to bear on the roll 23. The frictional contact causes the rotation of the cam which, in consequence of its irregular form, serves first to lift the yoke above its original position, thereby elevating the reed 24 or 25, as the case may be, and causing operation of the corresponding escapement, after which the continued rotation of the cam lowers the yoke to its first position on the supporting-dog 19, which has in the meantime assumed its original position. At the same instant the cam comes to a rest against the stop 22 and out of contact with the driving roll. It will be observed that the reeds 24 and 25 are extended downward from the keyboard, and that they act on the ecsapement-controlling levers 31 at a point below the keyboard. It will be observed that the dog-controlling slides 18 and the reeds 24 and 25 are alternated in arrangement. In other words they are interleaved so that they serve to mutually guide and support one another.

The extension of the operating connections from the keyboard downward instead of upward, as usual, permits of an unobstructed space above the keyboard, and also admits of the escapement connections being carried across the machine below the keyboard in positions in which they do not interfere with the other parts.

*Assembling channels.*—Reference has already been made to the assembling funnels 40, located below the magazines to receive the matrices therefrom. These funnels, located one below each pair of magazines, or in other words, below each dual magazine, consist in part of vertical side-plates of a generally triangular form, and a vertical center plate 40$^b$, which are secured to the escapement brackets 11 and 12. Between the edges of the side-plates, and secured thereto, are the bars 40$^c$ and 40$^d$, which converge toward their lower ends. The upper surfaces of these bars are spirally formed or twisted toward their lower extremities where there exists between them a narrow throat or slot for the escape of the matrices. This slot lies in a plane parallel with the side face of the magazine, in order to deliver the matrices sidewise upon the assembler-belt 41, the matrices being given a quarter turn after leaving the magazine and before reaching the delivery slot or throat by means of the bars 40$^c$ and 40$^d$ and the partitions 40$^f$. The matrices from the front channels of the magazine have a greater distance to travel to the mouth of the funnel than those in the rear channels, because of the inclination of the magazines. In order to equalize the time required for the passage of the various matrices to the delivery mouth, the angles of the front and back bars 40$^c$ and 40$^d$ are so established that matrices from the different magazine channels travel in equal times to the delivery throat.

The space between the plates is divided by partitions 40$^f$, which assist in guiding the matrices, and which are placed at various angles, as shown, so that matrices from the different magazine channels will occupy the same length of time in falling from their escapements to the mouth of the funnel. The lower ends of the partitions 40$^f$ are curved, and the longer ones have a spiral twist, so that the matrices fall with a turning motion in a smooth uninterrupted course. The center plate 40$^b$ serves to keep the matrices from the two compartments of the magazine separate during the first part of their fall, in order to prevent them from turning. It will be observed that as the matrices descend from the magazine, they are given a quarter turn around their longitudinal axes so that they are delivered endwise and sidewise upon the underlying assembler belt 41, before referred to. The bar 40$^c$ is pivoted at the upper end and may be swung downward to the position indicated in dotted lines in order to give access to the interior of the funnel in the event of matrices lodging therein.

*Assembler belt.*—This belt 41 is mounted to travel around guide-pulleys 44, preferably with a downward inclination toward its delivery end. It passes beneath the mouths of the funnels leading from all the magazines, and delivers the matrices successively into the assembling or alining channel in the top of the assembling elevator 43. For the purpose of assembling the matrices, the usual resisting devices will be employed in front of the line, and the usual star-wheel 42, or equivalent pushing device, provided to urge the matrices one after another against the end of the line and to advance the line into the assembler as it is elongated by the addition of matrices.

*Line - transferring and casting mechanisms.*—The casting mechanism and the means for transferring the line thereto and therefrom may all be of the same construction as in the ordinary commercial Mergenthaler machine, or of any other appropriate construction. As these parts are foreign to my invention, I have deemed it unnecessary to illustrate them herein.

*Line-elevator.*—After the composed line has served its purpose at the mold and been lifted therefrom by the usual lifting mechanism, it is necessary that it shall be further lifted to the top of the machine in order that the matrices may be distributed to their proper magazines and to the appropriate channels therein. For this purpose I employ a line-elevator having a vertical motion and also a horizontal turning motion.

As shown in Figs. 1, 2 and 4, 50 represents the elevator-bar having longitudinal teeth along its lower edge to engage the teeth of the matrices and hold them in suspension after the manner of the elevator used in the Mergenthaler machine. This bar 50 is connected by a horizontal pivot 50$^a$ to a supporting-arm 51 mounted to slide upward and downward on a guide-rod 58, which is provided, as shown, with a twisted groove to receive the end of a screw 51$^a$ in the arm. When the arm is in the lowermost position, the bar 50 stands parallel with the assembling-elevator 43 so that the line of matrices may be transferred endwise into engagement with the bar. As the arm 51 rises, carrying the bar and the line of matrices suspended therefrom, the groove causes the arm to swing or turn horizontally until finally, at the completion of its upward movement, it stands in a plane at right angles, or substantially so, to that in which it started. This has the effect of presenting the matrix line parallel with the side of the magazine, as shown in Fig. 1, at right angles to the position in which it was assembled, and this for the purpose of facilitating the distribution, as hereinafter described. The elevator-bar 50 is free to rock on its pivot 50$^a$, and is so weighted that it stands normally in a horizontal position. When, however, it has completed its upward movement, as shown in Figs. 1 and 4, the bar contacts with a stop-pin 59, whereby it is canted or tipped to an inclination corresponding with that of the upper end of the magazine.

The elevator may be actuated by any suitable mechanism, for example, by a sleeve 57 mounted on the guide-rod 58 below the elevator arm, and connected by a link 56 to a lever 55, which is in turn connected by a rod 54 with an arm 54ª on a horizontal rock-shaft 53ᵇ, carrying a second arm 53 on a roller 53ª, which bears on the periphery of a lifting-cam 52. The cam acts through the intermediate parts to raise the elevator and thereafter permit its descent, holding the same at rest for a time in both the upper and lower positions.

It is necessary that the elevated line shall be delivered from the elevator-bar 50 in order to leave the elevator free to descend. This is accomplished, as shown in Fig. 4, by a second cam 60 acting on the roller 61ª of lever 61 pivoted at 61ᵇ and connected by link 62 to shifter-slide 63, the head of which, is in line with the matrices on the elevator-bar. The slide 63 is guided in a direction parallel with the upper end of the magazine so that when it is advanced, it pushes the matrix line from the elevator-bar 50 to a similar bar 65 in the distributer-box 65ª, this bar 65 sustaining all matrices of the line until they are removed one at a time by the distributing devices.

*Distribution.*—A line of matrices having been fed into the box 65ª it remains to separate and distribute them, each to the magazine in which it belongs and to the proper channel in that magazine.

Fig. 48 shows the delivery end of the distributer-box provided with the vertical lips 65ᵇ projecting beyond its end, and the horizontal supporting rails 65ᶜ extending into the interior. When the line of matrices is pushed forward by the shifter-slide, the ears of the forward matrix are arrested against the stop 65ᵇ, and the lower ears of said matrix in its final position, are supported by the rails 65ᶜ. The bar 65 is short enough to entirely clear the front matrix when in its final position, and the lips on one side of the box are cut away or slotted vertically as shown at 65ᵈ, Fig. 48, in such manner that the end matrix may be moved horizontally out of the box and away from the end of the line, whence it is carried to the font-separating mechanism, and thence through the appropriate distributer to the proper channel in its magazine.

*Font-separator.*—There is a distributer of the well-known Mergenthaler type for each magazine, and in advance of each distributer, mechanism for delivering thereto only those matrices which belong to the font carried in said magazine. In advance of each distributer there is a detector or separator mechanism to which the matrices are individually presented. Each of these mechanisms delivers to the adjacent distributer the matrices belonging to the font therein, but permits the other matrices to pass along step by step from one detector to another until they are delivered to the appropriate distributers.

Referring to Figs. 1 to 4 and 39 to 52 inclusive, the distributing mechanism is supported on rigid brackets 67. Journaled in these brackets and extending transversely of the magazines, is the horizontal distributer-shaft 68, which drives all the moving parts of the distributer, and which is belted from an intermediate shaft 47. On the left end of this shaft 68 is a crank-pin 69 connected by universal joints 70 to the angular lever 71 pivoted on the framework. The vertical arm of the lever is connected, as shown in Fig. 2, by a link 72 to the horizontally sliding pusher 73, Figs. 41, 42 and 43, by which the matrices are pushed one at a time laterally out of the distributer-box 65ª, as before referred to, for presentation to the successive detectors. The lever 71 is also connected by a link 72 to the horizontally reciprocating carrier-slide 74, shown in Figs. 2, 42, 43, 47 49, &c., imparting thereto a reciprocating motion parallel with that of the pusher 73. The carrier-slide is provided, as shown in Figs. 40, 41, 42 and 43, at its upper and lower edges with corresponding series of fingers 74ª, 74ᵇ, &c., equal in number to the magazines, to engage the matrices and carry them along edgewise step by step from one detector to another, as presently to be described.

Each detector or cradle 75, one for each magazine, is of the form shown in Figs. 44, 45 and 46. They are loosely mounted on a common horizontal shaft 76 opposite the edges of the respective magazines, so that their upper ends, which receive the matrices, may rock toward and from the magazines under the influence of mechanism which will be presently described. Each cradle is provided in the upper end with transverse slots 75ª to guide the upper and lower ends of the matrices horizontally therethrough, and when the parts are at rest, these slots stand in line with each other and opposite the slide 73, which delivers the matrices successively from the distributer-box, so that they may be carried edgewise in a continuous line through one or more of the cradles successively, until they arrive opposite their magazines. The lower parts of the raceway slots 75ª are formed partly by plates 75ᶜ and 75ᵈ, the purpose of which will presently appear. As each matrix is pushed into the raceway slot 75ª of the first cradle, it is arrested by the tooth 74ª of the carrier-bar 74, and thus prevented from being carried too far by its momentum. As soon as the first matrix reaches the center of the first cradle, the latter rocks backward toward the magazine, and in this movement, the cradle carries with it the matrix into the ward-box 7ᴬ on the end of the adjacent magazine, this box, previously referred to, being clearly shown in Figs. 8 & 9 and 10. The side walls of this box serve to guide the body of the matrix as it is carried in flatwise by the cradle, and the box is provided on one side and at the bottom with ward-plates $7^b$ and $7^c$, each having one or more ejector teeth. These teeth vary in number, size or arrangement as between the boxes of the different magazines, and the matrices belonging in the respective magazines, shown in Fig. 52 and already described, have their notches $66^a$ and $66^b$ arranged to correspond. In other words, the matrices of different fonts differ as to their notches, all matrices in each font or set being notched alike to correspond with the teeth in the ward-box of the magazine in which they are stored. The ward-plates serve to prevent any matrices from passing, except those which belong in the adjacent magazine, and upright channels $7^D$ in the walls of the box serve to guide the ears of the matrices as they are lifted out of the box into the conveyer above.

If a matrix carried backward in the cradle cannot pass the ward-plates, it bears against them, holding the cradle from further movement. In this position the matrix has traveled back so far that the ends of the teeth $74^a$ clear it. The slide 74 and pusher 63 then return to their initial positions. The teeth $74^b$ on the slide are so placed that when the slide is at its extreme left-hand position, there are two beveled teeth or a pair of teeth in front of each cradle, one at the top and one at the bottom of the slide. These double teeth are adapted to embrace the body of the matrix between its upper and lower ears when the cradle comes forward after the matrix has been refused by the ward-plates. The slide then moves to the right again and carries the first matrix over into the slot of the second cradle while the pusher-slide removes a second matrix from the line and carries it into the first cradle. Each matrix is thus transferred from the line in the distributer-box and passed into each cradle in turn, and presented by each cradle to the corresponding ward-plates until it arrives opposite its magazine, when, for the first time, the ward-plates will permit it to pass and be disposed of by the lifting mechanism described below. In other words, a matrix transferred by the line into the first cradle, is presented to the first ward-plate, and if refused thereby, is moved forward and then shifted into the second cradle and presented to the second ward-plates, and so on repeatedly until it arrives at the proper point.

It will be noticed, on reference to Fig. 47, that the slide 74 has a slot in which the actuating pin of link 72 works. This permits a short dwell or pause of the slide at the end of each stroke, giving time for the cradle to move the matrices out of the teeth and into them again. As shown in Fig. 2, stop-pins $74^c$ on the slide, in position to encounter the main-frame, prevent the slide from overrunning. The pusher slide 73 has no slot for its actuating pin, and consequently it receives a slightly longer stroke than the carrier-slide, thus causing the pusher to draw to the left slightly beyond the matrix in the distributer-box, allowing time for the matrix to move forward. After each matrix has passed the ward-plates, it must be raised to the mechanism by which it is conveyed through the corresponding distributer for delivering the matrices to the individual channels in the one magazine. This lifting is effected by the slides 88 guided in the plates 89 carrying at their upper ends blades 90 which act beneath the matrices when the cradle is rocked fully backward, so as to lift the matrices from the cradles and upward through the ward-boxes, in the manner clearly shown in Fig. 39. When a matrix has been lifted so far that its upper ears are above the raceway groove of the cradle, the cradle is permitted to swing forward to meet the carrier-slide 74, leaving behind the matrix which is being lifted, as shown in Fig. 39, the lower ears of the matrix being at such time in the channels $7^D$ of the ward-box. This forward movement of the cradle before the matrix has been fully lifted, is made possible by having the back part of the cradle at the top cut away to clear the body portion of the matrix, the upper raceway slots $75^a$ being open at the top to allow the matrix ears to pass through. This is clearly shown in Figs. 44, 45 and 46. When the matrix is lifted still further, its lower part must be guided across the space above the ward-box previously occupied by the top of the cradle. The surfaces $75^c$, Figs. 44, 45 and 46, serve as a guide for the matrix ears at the front, while at the back the body of the matrix is sustained by the lug $91^a$ of the bar 91 which is fastened to the distributer framework above. These movements are important because although the matrix is lifted more than its own length and is guided positively while being lifted, the cradle is free to move during the lifting operation, so that the mechanism may be speeded as rapidly as if the matrix were lifted only a short distance. Consequently the mechanism is adapted to distribute the matrices with great rapidity.

The purpose of the plates $75^c$ and $75^d$ on the cradles will now be apparent. They are adapted to pass over the ward-plate $7^b$ at the same time allowing the bottom of the matrix to protrude below them and thus engage with the ward-plate. The space between the inner opposing edges of the plates $75^d$ affords clearance for the lifter 90 when the cradle goes forward, as shown in Fig. 46. The cradles are vibrated and the lifters reciprocated in the manner following.

As shown in Figs. 39, 40 and 41, all of the cradles are mounted loosely on a common horizontal rock-shaft 76, seated in bearings in the frame and provided at one end with an arm 78, bearing against cam 79 on the shaft 68. A series of springs 80 bear beneath the lower arms 75$^b$ of the cradles, tending to rock them forward toward the distributers. The rock-shaft 76 has pinned fast to it a series of arms 77, overlying the lower arms of the respective rockers, and carrying screws 77$^a$, which bear on said arms. When, therefore, the rock-shaft is turned to the left through the action of the cam 79, the screws 77$^a$ depress the lower arms of the cradles against the opposition of spring 80, thereby swinging the cradles forward to the position for receiving the matrices. As the cam relieves the arms from pressure, the cradles are swung in the opposite direction by the springs. It will be observed that under this arrangement, the matrices are carried toward the detector plates by a yielding or spring action and also in the reverse direction positively. The lifter-slides 88 are each connected by a link 87 with an arm 86 mounted loosely on a shaft 85, and continued beyond the shaft in the form of an arm 84, which is pivoted to a ring 82 encircling an eccentric 81 on the shaft 68, as shown in Figs. 40 and 41, the one shaft carrying all the eccentrics. The eccentrics communicate motion through the intermediate parts to the lifter-slides, which are moved positively upward and downward. The parts are so timed and the cams 79 so formed that the cradles swing forward with the matrices before the lifters rise, the return motion of the cradles beginning, however, before the lifters complete their upward movements.

*Distributers.*—The matrices, after being separated according to font, as above described, pass to the distributers proper through which they are delivered to the magazine channels. There is a distributer for each magazine, and each distributer consists primarily of a fixed inclined bar 98, overlying the magazine from one edge to the other, the bar being provided at the lower edge with a series of longitudinal distributing teeth permuted or varied in arrangement at different points in the length of the bar, after the manner fully described in U. S. patent to Mergenthaler No. 347,629, so that the matrices having corresponding arrangements of teeth will be individually suspended from the bar while being carried along the same until they arrive over their appropriate channels in the magazine, in a manner well understood by those skilled in the art.

For the purpose of carrying the matrices along the distributer-bars, I employ endless chains, such as shown in Figs. 3, 39, 40, 41, 50, 51, &c., composed of plates having vertical grooves into which the matrices are raised by the lifters 90, already referred to. The distributer-bars are secured to a skeleton frame 92, such as shown in Fig. 6, this frame having trunnions 92$^a$ pivotally mounted on a horizontal shaft 93 in the main-frame so that it may be turned upward away from the magazines in order to give access to the distributer-bars, the conveyers, and the upper ends of the magazines. The lower end of the frame 92 rests upon an upward extension of the main-frame, as shown in Fig. 4. Springs 115 may be connected with this frame, as shown, and made of suitable strength to sustain the frame when lifted, or to assist in lifting it.

Each conveyer chain consists of a series of links, such as shown in Fig. 50, comprising two parallel plates 97$^a$ placed back to back and secured to one end of intermediate arms 97$^b$, each carrying at one end a roller 97$^d$. Links such as above described and shown in Fig. 50, are arranged end to end in an endless series and are supported and guided by rails 101 secured to the distributer-frame through cross-bars 100 in such position that the rollers 97$^d$ travel upon them. The arm of one link is projected between the plates of the next, and connected therewith by the pivot of the roller 97$^d$ or a special pivot, thus forming an endless chain.

Motion is communicated to the distributer-links by sprocket-wheels 95 notched to engage the rollers 97$^d$. At the opposite end, the chain of distributer-links passes around sprocket-wheels 96 mounted loosely in a shaft 94 seated in the distributer-frame. In order to communicate an intermittent movement to all the chains so as to carry their grooves and the contained matrices along step by step over the successive channels of the magazine with a pause or dwell over each channel, I employ the mechanism shown in Figs. 2 and 4. The driving sprockets 95 are all secured to the shaft 93, and at one end this shaft is provided with a wheel 102 having radial slots in its periphery. An arm 83, slotted at one end to embrace the shaft 93 of the sprockets 95 and provided with a blade 83$^a$ to enter the notches in the wheel 102, is connected at the opposite end to an eccentric strap carried by an eccentric 81 on the shaft 68.

The motion imparted to the finger 83$^a$ by the revolution of the eccentric, causes the finger in rising to enter one of the radial notches in the wheel 102, and thereafter turn the lower side of the wheel backward, thereby advancing the conveyer chain one step, after which the blade is withdrawn from the notch, and the wheel permitted to remain at rest during about one-half a revolution of the eccentric, after which the blade is again engaged, the wheel turned, and the chain advanced as before. In this manner, the links of the conveyer-chain are advanced positively and through definite distances, and are permitted to rest momentarily in such a position as to give the matrices ample time to descend by gravity from the links into the appropriate magazine channels.

*Automatic distributer-stop.*—Reference has been made to the notched sliding bar 7ʲ seated in the top of each magazine and urged forward by the spring 7ᵏ. When the magazine is in operative position, this bar, contacting with the main-frame, as before explained, is held back against the pressure of the spring in such position that the matrices may freely enter the magazine. This is the normal position of the bar. If a matrix entering the magazine should lodge in an improper position, before escaping entirely from the conveyer it will be carried forward by the latter, and acting against the safety-bar 7ⁱ will move the latter backward beyond its normal position and against the resistance of the spring. When this occurs, the rear end of the bar will contact with the cross-bar 105, which is extended under the distributer mechanism with two leverlike ends, one on either side, pivoted in rod 106 and held forward by the spring 107. The nose 108ᵃ of the lever 108, which rests normally against the cross-bar, is thus allowed to fly up under the influence of spring 111. This movement is transmitted by link 109 to lever 110 pivoted at 112. A pin on the upper end of lever 110 will then come in contact with the side face of a revolving cam on a friction clutch 113, through which the conveyer-shaft is driven, the effect being to open the clutch and permit stoppage of the mechanism. Reference has been made to the fact that the distributer-frame is hinged in order that it may be swung upward to carry the distributer-bars out of the way. This lifting of the distributer-frame in itself effects the disengagement of the distributing-clutch if it has not already been actuated by the safety-bar, for the reason that the cross-bar 105 in rising with the distributing-frame, removes the stop from the lever 108.

*Modification or equivalent.*—It will be obvious to the skilled mechanic that many of the parts herein shown and described may be modified in form and arrangement without changing their principle of operation or passing beyond the scope of the claims herein. For example, the ward-plates or detectors 7ᵇ and 7ᶜ may be modified in form or replaced by any other equivalent devices which will prevent the passage of improper matrices, the only requirement being that these detectors, which are really stop devices, should be of such form and character as to permit the passage of similarly nicked matrices belonging to one font, while preventing the passage of matrices differently nicked and belonging to other fonts. While it is preferred to attach these ward-plates and their supporting boxes 7ᵃ on the end of the magazine, it will, of course, be understood that they may be supported in any manner on the frame of the machine. The advantage of attaching them to the magazine lies in the fact that its introduction into the machine is necessarily accompanied by the introduction of the means for preventing the entrance of improper matrices. In other words, each magazine carries its own protective devices. The ward-plates, as shown in Figs. 8, 10, &c., are secured in place by screws so that they may be removed and interchanged at will, so that any magazine may be adapted to carry any required font. The only essential requirement in this regard is that the ward-plates may be removed and applied at will, and they may be secured in any suitable manner.

Having described my invention, I claim and desire to secure by Letters Patent:—

1. In a line-casting machine, an upright magazine having channels adapted to sustain the descending matrices end to end, said channels laterally inclined as described, to cause frictional resistance against the side faces of the descending matrices.

2. In a line-casting machine, a magazine comprising upright parallel plates having their opposing faces provided with complementary grooves or channels inclined and arranged to sustain the descending matrices on their side faces; whereby the matrices are subjected to friction to retard their descent.

3. In a line-casting machine, the combination of parallel upright magazines, a series of converging channels below each magazine to deliver its matrices at a common point, and a single carrier belt arranged to travel transversely beneath the delivery ends of the several series of channels, substantially as shown.

4. Plural magazines each having upright walls and inclined channels therein to carry the matrices on their side faces, in combination with a common assembling belt arranged to travel transversely beneath the magazines, and means connected with each magazine for guiding its matrices to said belt.

5. In a line-casting machine, a magazine adapted to sustain matrices and comprising upright parallel plates having their inner faces provided with channels inclined from the vertical forty-five degrees, more or less; whereby they are adapted to sustain the edges of the matrices and to cause frictional resistance on their side faces to limit the speed of their descent.

6. A channeled magazine for matrices including as a permanent member a longitudinally movable bar located at the delivery end and provided with a series of projections, substantially as shown whereby the entire series of matrices may be locked and unlocked by movements of the bar.

7. In combination with a channeled magazine, an underlying bar movable endwise provided with lateral projections corresponding with the series of channels; whereby it is adapted when in one position to retain the matrices in the magazine, and when in another position, to permit the escape of the matrices between the projections.

8. In combination with a channeled magazine, an underlying bar with lateral projections, and means for moving said bar both longitudinally and vertically; whereby it may be caused to lock the matrices in the magazine, and also to lift them above their normal positions.

9. In combination with a channeled magazine, an underlying bar with projections to engage the matrices, and connected eccentrics for operating said bar.

10. In combination with a channeled magazine, a sliding matrix-confining bar located at its top and provided with notches adapted to register with the channels of the magazine when the bar is in one position.

11. In combination with a channeled magazine, a sliding bar located at its receiving end and provided with laterally projecting teeth, adapted to confine the matrices in the magazine channels and a spring acting to urge the bar endwise.

12. In combination with a main-frame and a removable channeled magazine, a longitudinally movable bar mounted on the top of the magazine to lock the matrices therein, a spring tending to hold the bar in the locking position, and means whereby the bar is automatically moved from said position when the magazine is placed in operative position.

13. In combination with a supporting-frame, a removable magazine, a sliding bar 7¹, a spring tending to move the bar endwise, and means for moving the bar in opposition to the spring as the magazine assumes its operative position.

14. In combination with a supporting-frame and a removable magazine, a movable matrix-locking device at the upper end of said magazine, and a spring whereby said bar is moved to confine the matrices as the magazine is moved from its operative position.

15. In a machine of the class described, a vertical magazine provided with a transverse supporting bar on the outside and removable in a vertical plane from the machine, in combination with the main-frame having a supporting surface extended beyond the operative position of the magazine to coöperate with said bar and sustain the magazine as the latter is inserted and removed.

16. In combination with the upright magazine having a transverse supporting bar on the outside, a main-frame provided with brackets 4 and knees 6.

17. In combination with an upright rectangular magazine, the main-frame provided with the supporting surfaces adapted to permit the magazine to slide from its operative position and thereafter turn cornerwise out of the machine.

18. In combination with the main-frame having knees 6 with upturned ends, an upright magazine provided with side-bars adapted to engage said knees to assist in sustaining and guiding the magazine as it is inserted and removed.

19. In combination, a main-frame and an upright magazine removable therefrom, said parts adapted to interlock substantially as described to permit the magazine to be turned cornerwise in a vertical plane out of the frame.

20. A flat upright magazine having inclined channels to sustain the matrices on their side faces, in combination with a transverse underlying conveyer and a series of converging twisted channels arranged to receive the matrices from the magazine, give them a quarter turn, and deliver them at a common point to the conveyer.

21. Two or more upright parallel magazines each having channels to sustain the matrices on end in columns, in combination with an underlying conveyer, and series of twisted converging channels located between the respective magazines and the conveyer; whereby the matrices from the several magazines are delivered to the conveyer at different points.

22. Rectangular channeled magazines arranged in parallel vertical planes and canted cornerwise, in combination with converging downwardly extending channels below the delivery end of each magazine, and a common means for assembling the matrices delivered from all the last-named channels.

23. In combination with a channeled magazine, an escapement provided with two laterally projecting arms and adapted to rock about an axis parallel with the path of the matrices, or substantially so.

24. An escapement device consisting of a rock-shaft provided at different points in its length with two laterally projecting arms adapted to engage opposite ends of the matrices.

25. An escapement comprising a rock-shaft with two pairs of arms projected in opposite directions and set out of line, substantially as described; whereby it is adapted to coöperate with two magazines and to release matrices from one of them at a time.

26. In combination with two channeled magazines, an intermediate escapement comprising a rock-shaft and two pairs of arms projecting in opposite directions therefrom to enter the respective magazines.

27. In combination with two channeled magazines, an intermediate rock-shaft provided with two pairs of arms entering the respective magazines, means for holding the same in a normal position, and finger-key connections for turning the same to the right or the left at will; whereby the one escapement is adapted to control the delivery of matrices from two magazines.

28. In combination with two magazines and an intermediate escapement controlling the matrices in both magazines, means for holding the escapement in an intermediate position, two finger-keys and means whereby said keys are enabled to turn the escapement to the right and left respectively.

29. In combination with an escapement-actuating bar 14, an actuating lever 15 adapted to rock in either direction, a spring tending to hold said lever in a central position, and finger-key connections whereby the lever may be rocked to the right or the left as required.

30. In combination with a magazine and a series of matrices having ears at the ends, an escapement arranged to rock about an axis parallel with the path of the matrices, said escapement having lateral arms 13$^a$ and 13$^b$, adapted to engage the matrices, substantially as described.

31. A magazine channeled to sustain matrices in columns and inclined edgewise at the upper end, in combination with a correspondingly inclined distributer and mechanism arranged to carry the matrices successively over the upper end of the magazine from the high toward the lower corner.

32. A series of upright magazines having their upper ends inclined edgewise, in combination with an elevator adapted to lift composed matrices from fonts in all the magazines, means for separating the matrices according to font, and downwardly inclined distributers arranged to deliver said separated matrices to the channels of the respective magazines.

33. In combination with a series of upright magazines and means for distributing composed matrices of different fonts to the respective magazines, an elevator adapted to present a composed line to the distributing mechanism, said elevator having both a rising and a horizontally turning motion, as described.

34. A magazine wherein the matrices descend end to end on their side faces to the delivery points, in combination with a conveyer arranged to travel at right angles to the magazine, and intermediate guides whereby the descending matrices are given a quarter turn and delivered in a downward direction flatwise to the conveyer.

35. An upright magazine channeled to receive the matrices in columns, in combination with a turning elevator arranged to receive the composed matrices in planes at right angles to those in which they stand in the magazine, and present them alongside the magazine in planes parallel to those in the magazine, a distributer extending over the magazine, and means for delivering the elevated matrices edgewise to the distributer.

36. In combination, a magazine channeled to receive the matrices in columns, a distributer for delivering the matrices to the individual channels, a distributer-box to receive the composed line from the elevator, and means for delivering the matrices horizontally edgewise from said box one at a time to the distributer.

37. In a matrix-separating mechanism, a vibratory carrier to which the matrices are presented, a lifting mechanism to remove the matrices therefrom, and a ward-plate arranged in the path of the matrices to arrest those which are not provided with corresponding notches.

38. In a matrix-separator, a vibratory carrier, means for presenting the matrices singly thereto, means for delivering the matrices from the carrier at a definite point, and a stationary ward-plate or detector in the path of the matrices to prevent the passage of improper matrices to the delivery point.

39. In combination, a horizontal vibrating matrix-carrier, means for delivering the matrices horizontally and singly to said carrier, a ward-plate located in the path of the carrier, and means located beyond the ward-plate for delivering the matrices which have passed the same.

40. A vibratory matrix-cradle or carrier 75, in combination with means for presenting matrices singly thereto, means for delivering the matrices at a different point therefrom, and a ward-plate or stop located at an intermediate point to prevent the passage of improper matrices.

41. A matrix-carrier, spring connections for moving the same in one direction, means for moving the same in opposition to the spring, means for presenting single matrices to the carrier, means for delivering matrices therefrom at a different point, and a ward-plate or stop to arrest the advance of the carrier and a contained matrix of improper form; whereby the passage of a matrix to the delivery point is prevented.

42. In combination, the vibratory matrix-carrier, means for presenting the matrices singly thereto, a ward-plate to arrest the advance of an improper matrix and the carrier, a lifting device beyond the ward-plate to deliver the matrices from the carrier, and a conveyer to receive said matrices.

43. In combination with a swinging carrier or cradle 75, a ward-plate, means for delivering matrices to the carrier, distinct means for delivering matrices from the carrier beyond the ward-plate, a conveyer to receive the matrices when removed, and a toothed distributer to engage the matrices as they are advanced by the conveyer.

44. In combination with two or more distributers, a corresponding number of vibratory matrix-carriers, variant ward-plates in the paths of the respective carriers, means beyond the ward-plates for delivering the matrices to the respective distributers, and means for delivering the matrices successively from one carrier to another in the event of their failing to pass the ward-plates; whereby the individual matrices are successively tested and delivered only to the proper distributers.

45. A series of matrices of different fonts differentiated in form according to font, and means for sustaining said matrices in composed lines, means for removing the matrices successively from the end of the line and carrying them edgewise in a common path, a series of vibratory carriers arranged in a common line to receive the matrices successively, ward-plates arranged in the path of the respective carriers to determine the advance of the matrices by the carriers according to font, and means for delivering the matrices which pass the ward-plates to different distributers.

46. In combination, a series of vibratory matrix-carriers 75, a slide 73 for presenting matrices to the first carrier, a slide 74 for advancing the retained matrices from one carrier to another, ward-plates to control the passage of the matrices with the carriers according to font, and lifters 90 beyond the ward-plates to deliver the matrices from the respective carriers.

47. In combination with a vibratory carrier 75, a lifter-slide 90, ward-plates to determine which matrices shall be advanced by the carrier to the lifter, and plates 75$^c$ to sustain the matrices during the advance of the carrier.

48. In combination with the vibratory carrier, the ward-plates, and means for delivering the matrices from the carrier, side-plates 75$^d$, substantially as and for the purpose described.

49. In combination, a distributer-bar, means for conveying the individual matrices along the bar, means for maintaining the composed line parallel with the bar, means for moving the matrices individually edgewise to the position below the conveyer, and means for lifting the matrices individually to the conveyer.

50. In a matrix-distributer, means for feeding the matrices singly horizontally from the end of the composed line, means for thereafter lifting the matrices individually, and the distributing mechanism which receives said matrices.

51. In combination, a channeled magazine having its upper end inclined downward from one edge to the other, an inclined distributer overlying said magazine, means for presenting the matrices one at a time to the upper end of the distributer, and means for causing the matrices to advance along the distributer until they arrive over their respective channels.

52. In combination with a channeled magazine having an inclined upper end, an overlying distributer having a corresponding inclination, said distributer including means for advancing the matrices and sustaining them in inclined positions during their travel and during their passage into the channels; whereby the matrices are guided directly into the channels and prevented from assuming improper positions.

53. In combination with a magazine having an inclined receiving end, a correspondingly inclined distributer, including a conveyer with channels inclined from the vertical to receive and guide the edges of the matrices, whereby the matrices are advanced in inclined positions and guided in their passage into the channels.

54. In combination with a magazine having an inclined receiving end, an inclined distributer including a conveyer with grooves inclined from the vertical to receive the edges of the matrices, and means for advancing the conveyer step by step; whereby the conveyer grooves are caused to form continuations of the magazine channels to properly guide the matrices into the latter.

55. In a distributer, a distributer-bar in combination with a conveyer comprising side-plates with continuous grooves therein to receive the edges of the matrices; whereby the matrices may be held in proper relation to the distributing-bar during their travel, and thereafter guided from the bar into the magazine channels.

56. In combination with the rising and horizontally turning elevator adapted to carry a composed line of matrices, means to deliver the line therefrom, means to receive and sustain the line, means to deliver the matrices edgewise from the line one at a time, and a distributing mechanism adapted to receive the matrices so delivered.

57. A rising and horizontally turning elevator having a line-carrying member adapted to turn on a horizontal axis; whereby a line may be elevated and turned horizontally at right angles to its original position, and thereafter tipped to an inclined position.

58. In combination with a fixed spiral guide 58, an elevator-arm 51, and a matrix-sustaining bar 50 pivoted thereto.

59. In combination with a lifting and horizontally turning elevator, the matrix-sustaining bar 50 pivoted thereto to tip vertically and arranged to stand normally in a horizontal position, and means acting to cant the bar and the matrix line thereon when elevated.

60. In combination with a distributer-bar, an endless conveyer consisting of two series of traveling parallel plates grooved in their inner faces to embrace the vertical edges of the matrices.

61. A distributer-bar, parallel chains with grooved plates connected by pivoted arms and provided with rollers 97$^d$, in combination with rails whereon said rollers travel.

62. In combination, parallel chains with grooved plates, sprocket-wheels for imparting motion thereto, and means for imparting to said wheels an intermittent rotation.

63. In a distributing mechanism, a distributer-box 65$^a$ provided with matrix-supporting rails 65$^c$ and with the end lips 65$^b$ to arrest the end matrix in a line, said lips being cut away on one side to permit the removal of the successive matrices edgewise from the box.

64. In a matrix-separating mechanism, and in combination with matrices notched at the end and also at the side, ward-plates arranged to coöperate with both series of notches and means for presenting the matrices flatwise to said plates.

65. In a linotype machine, a removable magazine having attached thereto a detector or font-distinguisher to prevent the entrance of wrong font matrices.

66. A portable magazine for a linotype machine, channeled to receive the matrices and provided with a ward-plate or detector to control the passage of matrices thereto, said detector adapted to permit the passage of all matrices belonging in the magazine channels, but exclude all others; whereby the entrance of wrong font matrices is prevented said detector located in the path common to all incoming matrices; whereby the entrance of matrices bearing different characters is permitted, but the entrance of matrices belonging to different fonts prevented.

In testimony whereof I hereunto set my hand this eighteenth day of November, 1907, in the presence of two attesting witnesses.

THOMAS SIMMONS HOMANS.

Witnesses:
L. B. MOREHOUSE,
JNO. F. STEVENS.